(12) United States Patent
Park et al.

(10) Patent No.: US 11,794,552 B2
(45) Date of Patent: Oct. 24, 2023

(54) VEHICLE THERMAL MANAGEMENT SYSTEM AND METHOD FOR CONTROLLING THE SAME

(71) Applicants:Hyundai Motor Company, Seoul (KR); Kia Corporation, Seoul (KR)

(72) Inventors: Joon Hyung Park, Gyeonggi-Do (KR); Jeung Hwan Yang, Gyeonggi-Do (KR); Tae Yun Kong, Gyeonggi-Do (KR)

(73) Assignees: Hynndai Motor Company, Seoul (KR); Kia Corporaton, Seoul (KR)

( * ) Notice: Subject to any disclaimer, the term of this patent is extended or adjusted under 35 U.S.C. 154(b) by 0 days.

(21) Appl. No.: 17/717,912

(22) Filed: Apr. 11, 2022

(65) Prior Publication Data

US 2023/0040086 A1 Feb. 9, 2023

(30) Foreign Application Priority Data

Aug. 3, 2021 (KR) ........................ 10-2021-0102191

(51) Int. Cl.
*B60H 1/22* (2006.01)
*B60H 1/00* (2006.01)

(52) U.S. Cl.
CPC ....... *B60H 1/0073* (2019.05); *B60H 1/00278* (2013.01); *B60H 1/00521* (2013.01); *B60H 1/00842* (2013.01); *B60H 1/00849* (2013.01); *B60H 1/2225* (2013.01); *B60H 2001/00307* (2013.01)

(58) Field of Classification Search
CPC .............. B60H 1/0073; B60H 1/00278; B60H 1/00521; B60H 1/00842; B60H 1/00849; B60H 1/2225; B60H 1/00864; B60H 1/00057; B60H 1/0005
See application file for complete search history.

(56) References Cited

U.S. PATENT DOCUMENTS

| | | | | |
|---|---|---|---|---|
| 4,072,186 A | * | 2/1978 | Barton | ............... B60H 1/00057 60/524 |
| 5,309,731 A | * | 5/1994 | Nonoyama | ........ B60H 1/00392 62/324.1 |
| 5,505,251 A | * | 4/1996 | Sarbach | ................... B60H 1/03 219/202 |

(Continued)

FOREIGN PATENT DOCUMENTS

KR 10-2020-0040996 A 4/2020

*Primary Examiner* — Nelson J Nieves
(74) *Attorney, Agent, or Firm* — MORGAN, LEWIS & BOCKIUS LLP

(57) ABSTRACT

A vehicle thermal management system, may include a heating, ventilation, and air conditioning (HVAC) subsystem including an HVAC casing in which a heater core and an evaporator are received; and a cooling subsystem including a coolant loop through which a coolant circulates, wherein the heater core is located on the downstream side of the evaporator in an air flow direction, and the coolant loop is thermally connected to the heater core. The HVAC subsystem includes: an air mixing chamber located on the downstream side of the heater core within the HVAC casing; a discharge pipe fluidically communicating with the air mixing chamber, and being opened to the outside of a passenger compartment; and a flap configured for selectively opening and closing the discharge pipe.

18 Claims, 8 Drawing Sheets

(56) References Cited

U.S. PATENT DOCUMENTS

| | | | | |
|---|---|---|---|---|
| 5,642,856 A * | 7/1997 | Samukawa | B60H 1/00864 | |
| | | | 165/203 | |
| 5,699,960 A * | 12/1997 | Kato | B60H 1/0065 | |
| | | | 237/12.3 A | |
| 5,971,290 A * | 10/1999 | Echigoya | B60H 1/03 | |
| | | | 237/12.3 A | |
| 5,983,659 A * | 11/1999 | Lemaitre | F24F 13/22 | |
| | | | 62/89 | |
| 7,004,245 B2 * | 2/2006 | Abdeljawad | B60H 1/00064 | |
| | | | 165/203 | |
| 10,625,569 B2 * | 4/2020 | Fujii | B60H 1/00735 | |
| 10,836,235 B2 | 11/2020 | Han et al. | | |
| 2003/0066299 A1 * | 4/2003 | Aoki | B60H 1/00864 | |
| | | | 236/91 C | |
| 2005/0126772 A1 * | 6/2005 | Eberspach | B60H 1/3207 | |
| | | | 165/44 | |
| 2009/0314847 A1 * | 12/2009 | Nemoto | B60H 1/00828 | |
| | | | 237/12.3 A | |
| 2013/0333406 A1 * | 12/2013 | Takahashi | F25B 41/39 | |
| | | | 62/238.7 | |
| 2014/0096554 A1 * | 4/2014 | Buczek | B60H 1/00064 | |
| | | | 62/239 | |
| 2015/0043898 A1 * | 2/2015 | Gu | B60H 1/2225 | |
| | | | 392/360 | |
| 2016/0207371 A1 * | 7/2016 | Della Rovere | B60H 1/00057 | |
| 2017/0232813 A1 * | 8/2017 | Kullen | B60H 1/0005 | |
| | | | 62/285 | |
| 2017/0299232 A1 * | 10/2017 | Richter | B60H 1/00057 | |
| 2020/0108692 A1 * | 4/2020 | Lee | B60H 3/024 | |
| 2020/0114729 A1 | 4/2020 | Han et al. | | |
| 2020/0180395 A1 * | 6/2020 | Lee | B60H 1/00007 | |
| 2020/0189356 A1 * | 6/2020 | Lee | B60H 1/06 | |
| 2020/0298664 A1 * | 9/2020 | Lee | B60H 1/22 | |
| 2021/0178858 A1 * | 6/2021 | Wolf | B60H 1/00007 | |
| 2021/0300155 A1 * | 9/2021 | Kanou | B60H 1/00878 | |
| 2021/0323374 A1 * | 10/2021 | Shin | B60H 1/00057 | |
| 2022/0048364 A1 * | 2/2022 | Takase | H01M 10/613 | |
| 2022/0128273 A1 * | 4/2022 | Benouali | F25B 6/04 | |
| 2022/0134840 A1 * | 5/2022 | Evans | B60H 1/00007 | |
| | | | 62/117 | |
| 2022/0314742 A1 * | 10/2022 | Miyakoshi | B60H 1/3227 | |
| 2022/0339988 A1 * | 10/2022 | Maeng | B60H 1/00692 | |
| 2022/0363110 A1 * | 11/2022 | Ishizeki | F25B 5/04 | |

* cited by examiner

VEHICLE THERMAL MANAGEMENT SYSTEM AND METHOD FOR CONTROLLING THE SAME

CROSS-REFERENCE TO RELATED APPLICATION

The present application claims priority to Korean Patent Application No. 10-2021-0102191, filed on Aug. 3, 2021, the entire contents of which is incorporated herein for all purposes by this reference.

BACKGROUND OF THE INVENTION

Field of the Invention

The present disclosure relates to a vehicle thermal management system, and more particularly, to a vehicle thermal management system capable of improving heat exchange efficiency between a heating, ventilation, and air conditioning (HVAC) subsystem and a cooling subsystem, improving performance of the HVAC subsystem and performance of the cooling subsystem.

Description of Related Art

Vehicles may be classified into internal combustion engine vehicles, electric vehicles, hybrid vehicles, fuel cell vehicles, and the like. A vehicle includes a thermal management system to manage heat for a passenger compartment, powertrain components, batteries, and various power electronics.

The vehicle thermal management system includes a heating, ventilation, and air conditioning (HVAC) subsystem that heats or cools air flowing into the passenger compartment, and a cooling subsystem that cools a prime mover of a powertrain and a battery using a coolant.

The HVAC subsystem includes an evaporator, a heater core, and a temperature door (also referred to as an "air mixing door") disposed in a casing. The casing has an inlet through which the air is allowed to draw in the HVAC casing, and a plurality of outlets through which the air is directed from the HVAC casing into the passenger compartment. The evaporator may cool the air, and the heater core may heat the air which is directed into the passenger compartment. The air mixing door may be disposed between the evaporator and the heater core. The evaporator may be located upstream of the air mixing door, and the heater core may be located downstream of the air mixing door. The air mixing door may adjust the flow rate of air passing across the heater core, controlling the temperature of the air entering the passenger compartment.

The cooling subsystem may cool various vehicle components, such as the prime mover of the powertrain, the battery, the power electronics, using the coolant. For example, an internal combustion engine vehicle includes a mechanical powertrain including an internal combustion engine, a transmission, and the like, and the cooling subsystem of the internal combustion engine vehicle may be thermally connected to the internal combustion engine and its related components, cooling the internal combustion engine and its related components using the coolant. An electric vehicle includes an electric powertrain including an electric motor, its related power electronics, and a transmission, and a battery system, and the cooling subsystem of the electric vehicle may be thermally connected to the electric powertrain components and the battery system, cooling the electric powertrain components and the battery system.

The cooling subsystem may be thermally connected to the HVAC subsystem so that the coolant circulating in the cooling subsystem may exchange heat with a refrigerant circulating in the HVAC subsystem.

In the vehicle thermal management system according to the related art, however, heat exchange efficiency between the HVAC subsystem and the cooling subsystem may not be relatively high, and thus the performance of the HVAC subsystem and the performance of the cooling subsystem may be relatively low.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a vehicle thermal management system configured for improving heat exchange efficiency between a heating, ventilation, and air conditioning (HVAC) subsystem and a cooling subsystem, improving performance of the HVAC subsystem and performance of the cooling subsystem.

According to an aspect of the present disclosure, a vehicle thermal management system may include: a heating, ventilation, and air conditioning (HVAC) subsystem including an HVAC casing in which a heater core and an evaporator are received; and a cooling subsystem including a coolant loop through which a coolant circulates, wherein the heater core may be located on the downstream side of the evaporator in an air flow direction, and the coolant loop may be thermally connected to the heater core. The HVAC subsystem may include: an air mixing chamber located on the downstream side of the heater core within the HVAC casing; a discharge pipe fluidically communicating with the air mixing chamber, and being opened to the outside of a passenger compartment; and a flap configured for selectively opening and closing the discharge pipe.

When the cooling performance or cooling capacity of the cooling subsystem does not meet a cooling load for the vehicle components (an internal combustion engine, power electronics, a battery pack, various coolers, a turbocharger, etc.), the coolant circulating in the coolant loop of the cooling subsystem may be supplementarily or additionally cooled by the heater core, and thus the cooling performance of the cooling subsystem may be improved, and the performance of the HVAC subsystem may be kept constant. For example, when the HVAC subsystem operates in a cooling mode and the flap is opened, the air heated by the heater core may be discharged to the outside of the passenger compartment through the air mixing chamber and the discharge pipe, and thus it may not affect the cooling performance of the HVAC subsystem. Furthermore, the flow rate of the air passing across the heater core may be appropriately adjusted, and thus the cooling performance of the cooling subsystem may be improved.

The HVAC casing may include: an upper bypass passage defined between a top end portion of the heater core and a top wall of the HVAC casing; a lower bypass passage defined between a bottom end portion of the heater core and a bottom wall of the HVAC casing; an upper air mixing door movable to adjust an opening amount of the upper bypass passage; and a lower air mixing door movable to adjust an opening amount of the lower bypass passage.

As the upper air mixing door adjusts the opening amount of the upper bypass passage, the flow rate of the air passing across an upper portion of the heater core may be varied, and as the lower air mixing door adjusts the opening amount of the lower bypass passage, the flow rate of the air passing across a lower portion of the heater core may be varied. The flow rate of the air passing across the upper portion of the heater core and the flow rate of the air passing across the lower portion of the heater core may be varied selectively and independently, and thus the performance of the HVAC subsystem and the performance of the cooling subsystem may be flexibly adjusted according to the outside conditions of the vehicle or the user's requirements. Furthermore, under a specific condition, the performance of the HVAC subsystem and the performance of the cooling subsystem may be improved at the same time. For example, when the HVAC subsystem operates in the cooling mode and the flap is opened, the upper air mixing door may move downwardly and the flow rate of the air passing across the upper portion of the heater core may be minimized so that the flow rate of the air heated by the heater core may be minimized, and thus the cooling performance of the HVAC subsystem may be maximized. When the lower air mixing door moves downwardly and the flow rate of the air passing across the lower portion of the heater core is maximized, the air passing across the lower portion of the heater core may absorb heat from the coolant flowing through the coolant passage of the heater core, and thus the coolant may be cooled. The air heated by the heater core may be discharged to the outside through the air mixing chamber and the discharge pipe. Thus, the cooling performance of the coolant circulating in the cooling subsystem may be improved, and the cooling of the passenger compartment may not be affected.

The HVAC subsystem may further include a partition by which a space of the HVAC casing defined between the evaporator and the heater core is divided into an upper space and a lower space. The upper air mixing door may be movable in the upper space, and the lower air mixing door may be movable in the lower space.

Accordingly, the air having passed through the evaporator may be distributed to the upper space and the lower space. As for the air distributed to the upper space, the flow rate of the air passing across the upper portion of the heater core may be appropriately adjusted by the movement of the upper air mixing door. As for the air distributed to the lower space, the flow rate of the air passing across the lower portion of the heater core may be appropriately adjusted by the movement of the lower air mixing door. Thus, the performance of the HVAC subsystem and the performance of the cooling subsystem may be flexibly adjusted according to the outside conditions of the vehicle or the user's requirements.

The HVAC subsystem may further include a rear door which is rotatable in the air mixing chamber, and the rear door may move between a separation position in which the rear door separates the air mixing chamber into an upper air mixing chamber and a lower air mixing chamber and a communication position in which the rear door allows the upper air mixing chamber and the lower air mixing chamber to fluidically communicate with each other.

When the rear door is in the separation position, the upper air mixing chamber may be fluidly separated from the lower air mixing chamber so that the air having passed through the upper bypass passage and the air having passed through the upper portion of the heater core may be appropriately mixed in the upper air mixing chamber, and the air having passed through the lower bypass passage and the air having passed through the lower portion of the heater core may be appropriately mixed in the lower air mixing chamber. When the rear door is in the communication position, the air having passed through the upper bypass passage, the air having passed through the upper portion of the heater core, the air having passed through the lower bypass passage, and the air having passed through the lower portion of the heater core may be entirely mixed in the air mixing chamber. For example, when the HVAC subsystem operates in the cooling mode, the flap opens the discharge pipe, and the rear door is in the separation position, the lower air mixing chamber may be fluidly separated from the upper air mixing chamber, so that the air having passed through the upper air mixing chamber may be directed toward the passenger compartment, and the air heated by the lower portion of the heater core may be discharged to the outside of the passenger compartment through the lower air mixing chamber and the discharge pipe.

The HVAC subsystem may further include a PTC heater which is disposed on an upstream side of the heater core.

When the HVAC subsystem operates in a heating mode or warming-up of the battery pack is performed, the PTC heater may be operated so that heat of the PTC heater may be directly transferred to the heater core, and thus the heating performance of the heater core may be improved. When it is necessary to increase the temperature of the battery pack, the coolant may be heated by the PTC heater. The PTC heater is configured as a heater for increasing a battery temperature used in a battery cooling system of an electric vehicle according to the related art, simplifying the layout of the battery cooling system, and reducing the manufacturing cost thereof.

The HVAC casing may include an upper support supporting a top end portion of the PTC heater and the top end portion of the heater core, and a lower support supporting a bottom end portion of the PTC heater and the bottom end portion of the heater core.

The PTC heater and the heater core may be supported together by the upper support and the lower support in the HVAC casing of the HVAC subsystem, and thus the assemblability of the PTC heater and the heater core may be improved.

The HVAC casing may include an inlet through which the air is allowed to draw in the HVAC casing, and a plurality of outlets through which the air is directed from the HVAC casing into the passenger compartment. The plurality of outlets may include: a defrost outlet configured to direct the air toward a front windshield of the vehicle; a vent outlet configured to direct the air toward an occupant; a floor outlet configured to direct the air toward a floor of the vehicle; and a rear seat outlet configured to direct the air toward a rear seat of the vehicle. The rear seat outlet may be adjacent to the floor of the vehicle, the discharge pipe may be connected to the rear seat outlet, the discharge pipe may be opened toward the bottom portion of the floor of the vehicle, and the flap may be rotatable between the discharge pipe and the rear seat outlet.

As the discharge pipe is opened to the bottom portion of the floor of the vehicle, the air heated by the heater core may be rapidly discharged to the outside of the vehicle through the discharge pipe when the HVAC subsystem operates in the cooling mode, minimizing an effect of heat on the cooling of the passenger compartment.

The cooling subsystem may be an internal combustion engine cooling system including a coolant loop configured to cool an internal combustion engine. The coolant loop may be fluidly connected to the heater core, a water jacket of the internal combustion engine, an internal combustion radiator, a coolant control valve, and a coolant pump.

As the coolant loop configured to cool the internal combustion engine is fluidly connected to the heater core, the coolant heated by the water jacket of the internal combustion engine may be supplementarily cooled by the heater core. Accordingly, heat rejection of the internal combustion engine radiator may be relatively reduced, and thus the size of the internal combustion engine radiator and the size of a cooling fan may be reduced.

The cooling subsystem may be a battery cooling system including a coolant loop configured to cool a battery pack of an electric vehicle. The coolant loop may be fluidly connected to the heater core, the battery pack, a battery chiller, and a circulating pump, and the battery chiller may be configured to transfer heat between a refrigerant loop of the HVAC subsystem and the coolant loop.

As the coolant loop configured to cool the battery pack is fluidly connected to the heater core, the coolant heated by the battery pack may be cooled by the heater core, and the cooled coolant may cool the battery pack. Accordingly, the heater core may replace a radiator of a battery cooling system of an electric vehicle according to the related art, simplifying the layout of the battery cooling system, and reducing the manufacturing cost thereof.

The cooling subsystem may be a battery cooling system including a coolant loop configured to cool a battery pack of an electric vehicle using a battery radiator. The coolant loop may be fluidly connected to the heater core, the battery pack, the battery radiator, a battery chiller, and a circulating pump, and the battery chiller may be configured to transfer heat between a refrigerant loop of the HVAC subsystem and the coolant loop.

As the coolant loop configured to cool the battery pack is fluidly connected to the battery radiator and the heater core, the coolant heated by the battery pack may be selectively cooled by the battery radiator and the heater core, and thus the cooling of the battery pack may be improved.

The cooling subsystem may be a power electronics cooling system including a coolant loop configured to cool power electronics of an electric vehicle. The coolant loop may be fluidly connected to the heater core, the power electronics, a power electronics radiator, and a circulating pump.

As the coolant loop configured to cool the power electronics is fluidly connected to the power electronics radiator and the heater core, the coolant heated by the power electronics may be selectively cooled by the power electronics radiator and the heater core, and thus the cooling of the power electronics may be improved.

The cooling subsystem may be a battery-power electronics cooling system including a coolant loop configured to cool a battery pack and power electronics of an electric vehicle. The coolant loop may be fluidly connected to the heater core, the power electronics, the battery pack, a coolant radiator, and a circulating pump.

As the coolant loop configured to cool the battery pack and the power electronics is fluidly connected to the coolant radiator and the heater core, the coolant heated by the battery pack and the power electronics may be selectively cooled by the coolant radiator and the heater core, and thus the cooling of the battery pack and the power electronics may be improved.

According to another aspect of the present disclosure, a method for controlling a vehicle thermal management system including an HVAC subsystem including an HVAC casing in which a heater core and an evaporator are received, and a cooling subsystem including a coolant loop which is configured to cool a vehicle component may include: determining whether a temperature of a coolant circulating through the coolant loop of the cooling subsystem is higher than or equal to a first threshold; adjusting a position of an air mixing door to allow at least a portion of air cooled by the evaporator to pass across the heater core when the controller concludes that the temperature of the coolant is higher than or equal to the first threshold; and discharging the air heated by the heater core to the outside of the vehicle through a discharge pipe. The heater core may be located on the downstream side of the evaporator in an air flow direction, and the coolant loop may be thermally connected to the heater core.

The first threshold may be a reference temperature of the coolant for determining whether a cooling capacity of the cooling subsystem meets a cooling load for the vehicle component.

The method may further include separating, by a rear door, an air mixing chamber defined on the downstream side of the heater core into an upper air mixing chamber and a lower air mixing chamber. The rear door may be rotatable in the air mixing chamber, and the rear door may move between a separation position in which the rear door separates the air mixing chamber into the upper air mixing chamber and the lower air mixing chamber and a communication position in which the rear door allows the upper air mixing chamber and the lower air mixing chamber to fluidically communicate with each other.

The method may further include determining whether the temperature of the coolant is equal to or less than a second threshold when the controller concludes that the temperature of the coolant is lower than the first threshold.

The second threshold may be a reference temperature for determining whether it is necessary to increase a temperature of the vehicle component to be cooled by the cooling subsystem.

The method may further include operating a PTC heater to heat the coolant flowing through a coolant passage of the heater core when the controller concludes that the temperature of the coolant is equal to or less than the second threshold The second threshold may be higher than the first threshold.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
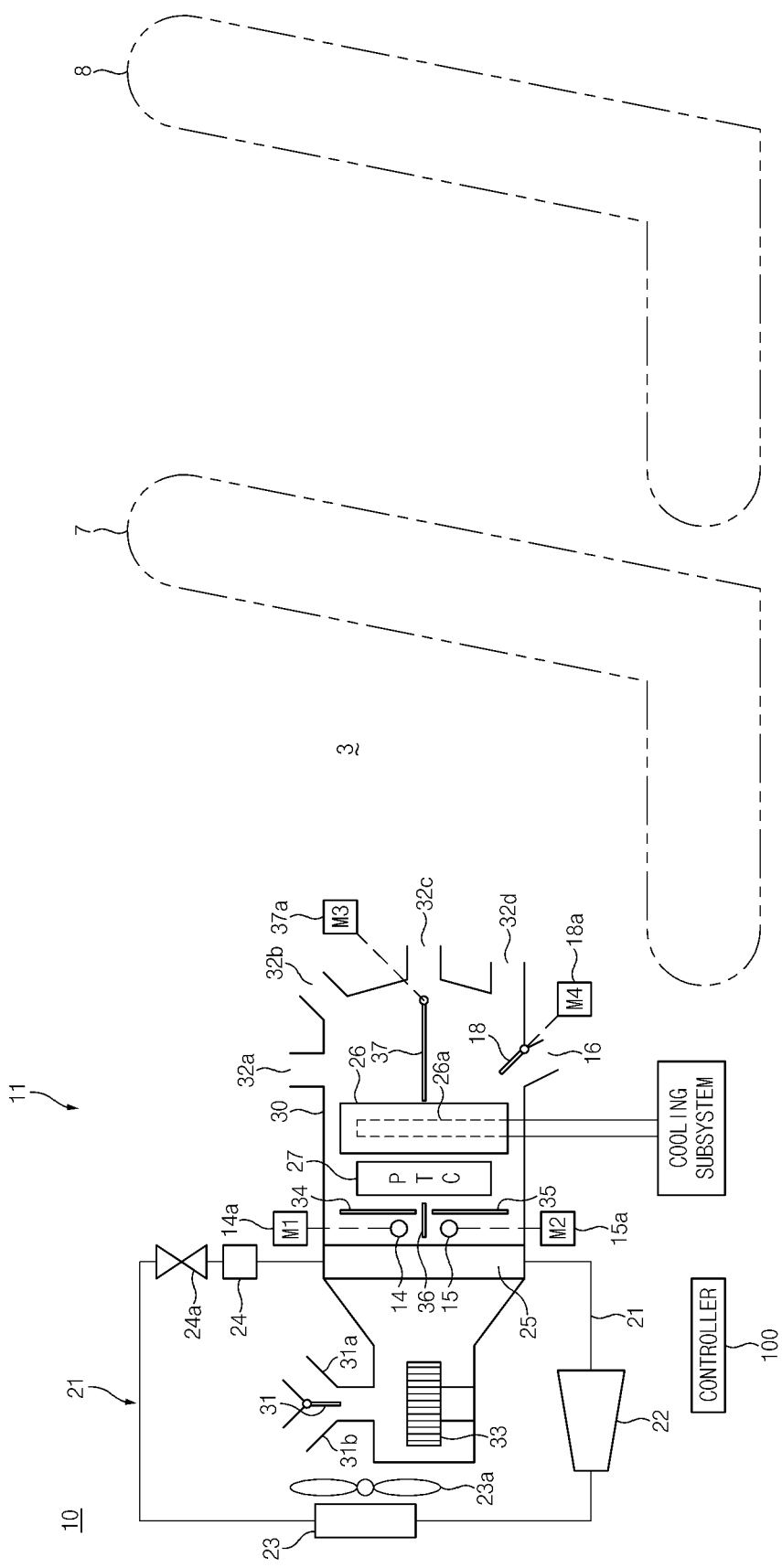
FIG. 1 illustrates a vehicle thermal management system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system 10 according to an exemplary embodiment of the present disclosure may include a heating, ventilation, and air conditioning (HVAC) subsystem 11 for heating or cooling air flowing into a passenger compartment 3 of the vehicle, and a cooling subsystem thermally connected to the HVAC subsystem 11.

The HVAC subsystem 11 may heat or cool the air flowing into the passenger compartment 3 of the vehicle using a refrigerant circulating in a refrigerant loop 21. The refrigerant loop 21 may be fluidly connected to a compressor 22, a condenser 23, an expansion valve 24, and an evaporator 25.

The compressor 22 may compress the refrigerant and circulate the refrigerant through the refrigerant loop 21. In an internal combustion engine vehicle, the compressor 22 may receive power (torque) of an internal combustion engine from a crankshaft of the internal combustion engine through an accessory belt system. In an electric vehicle, the compressor 22 may be an electric compressor which is driven by electrical energy.

The condenser 23 may be configured to condense the refrigerant received from the compressor 22. The condenser 23 may be disposed adjacent to a front grille of the vehicle, and accordingly the refrigerant may be condensed in the condenser 23 by releasing heat to the ambient air. A cooling fan 23a may be located behind the condenser 23. The condenser 23 may exchange heat with the ambient air forcibly blown by the cooling fan 23a, and thus a heat transfer rate between the condenser 23 and the ambient air may be further increased.

The expansion valve 24 may expand the refrigerant received from the condenser 23. The expansion valve 24 may be disposed between the condenser 23 and the evaporator 25 in the refrigerant loop 21. The expansion valve 24 may be located on the upstream side of the evaporator 25, adjusting the flow of the refrigerant or the flow rate of the refrigerant into the evaporator 25.

According to an exemplary embodiment of the present disclosure, the expansion valve 24 may be a thermal expansion valve (TXV) which detects the temperature and/or pressure of the refrigerant and adjusts the opening amount thereof. The expansion valve 24 may include a shut-off valve 24a located on the upstream side thereof. The shut-off valve 24a may selectively block or unblock the flow of the refrigerant into the expansion valve 24. According to an exemplary embodiment of the present disclosure, the shut-off valve 24a may be a solenoid valve. A controller 100 may control the shut-off valve 24a to open or close, so that the flow of the refrigerant into the expansion valve 24 may be blocked or unblocked. As the shut-off valve 24a is opened, the refrigerant may be allowed to flow into the expansion valve 24 and the evaporator 25, and as the shut-off valve 24a is closed, the refrigerant may be blocked from flowing into the expansion valve 24 and the evaporator 25. According to an exemplary embodiment of the present disclosure, the shut-off valve 24a may be mounted in the inside of a valve body of the expansion valve 24, opening or closing an internal passage of the expansion valve 24. According to another exemplary embodiment of the present disclosure, the shut-off valve 24a may be located on the upstream side of the expansion valve 24, selectively opening or closing an inlet of the expansion valve 24.

The evaporator 25 may evaporate the refrigerant received from the expansion valve 24. That is, the refrigerant expanded by the expansion valve 24 may absorb heat from the air in the evaporator 25 and be evaporated. During a cooling operation of the HVAC subsystem 11, the evaporator 25 may cool the air using the refrigerant cooled by condenser 23 and expanded by the expansion valve 24, and the cooled air may be directed into the passenger compartment.

Figure 2:
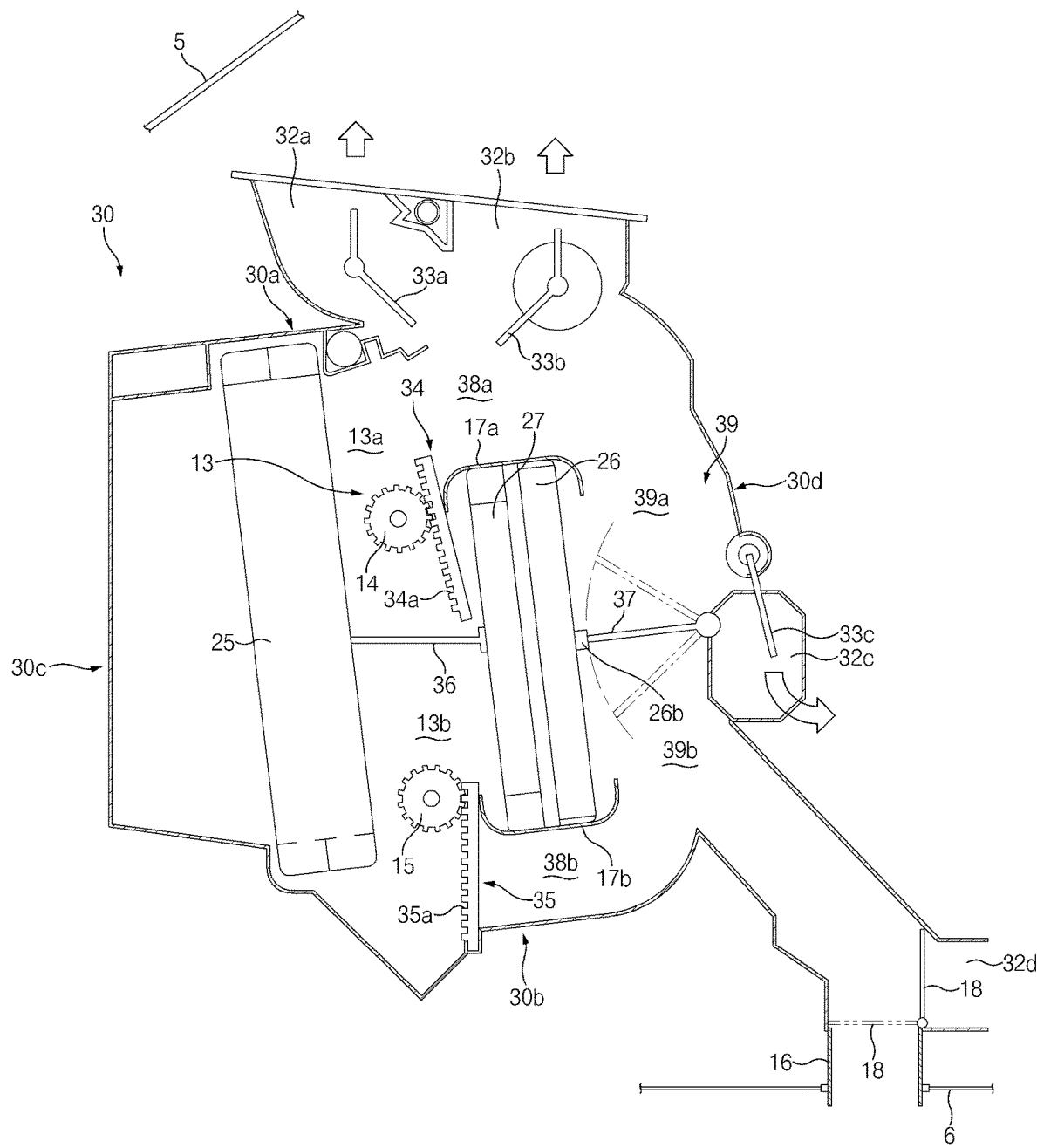
FIG. 2 illustrates a heating, ventilation, and air conditioning (HVAC) casing of an HVAC subsystem in the vehicle thermal management system illustrated in FIG. 1.

Referring to FIG. 1 and FIG. 2, the HVAC subsystem 11 may include an HVAC casing 30 configured to direct the air into the passenger compartment 3.

The HVAC casing 30 may be mounted on a dash panel by which a front compartment and the passenger compartment 3 are divided. Front seats 7 located in the front of the vehicle and rear seats 8 located in the rear of the vehicle may be arranged in the passenger compartment 3.

The HVAC casing 30 may accommodate the evaporator 25 and a heater core 26 located on the downstream side of the evaporator 25. The evaporator 25 and the heater core 26 may be sequentially arranged within the HVAC casing 30 in an air flow direction from upstream to downstream. The heater core 26 may have a coolant passage 26a therein, and a coolant passes through the coolant passage 26a.

The HVAC casing 30 may have two inlets 31a and 31b through which the air is allowed to draw in the HVAC casing, and a plurality of outlets 32a, 32b, 32c, and 32d through which the air is directed into the passenger compartment 3.

The two inlets 31a and 31b may include an inside air inlet 31a through which the inside air is allowed to draw in, and an outside air inlet 31b through which the outside air is allowed to draw in. An inlet door 31 may selectively open or close the inside air inlet 31a and the outside air inlet 31b. The inlet door 31 may be rotatably mounted between the inside air inlet 31a and the outside air inlet 31b. As the inlet door 31 rotates, the opening amount of the inside air inlet 31a and the opening amount of the outside air inlet 31b may be adjusted relative to each other. According to an exemplary embodiment of the present disclosure, the inlet door 31 may move between a first open position and a second open position. The first open position refers to a position in which the inlet door 31 completely covers the inside air inlet 31a so that the outside air inlet 31b may be fully opened and the inside air inlet 31a may be fully closed. When the inlet door 31 is in the first open position, the opening amount of the outside air inlet 31b may be 100%, and the opening amount of the inside air inlet 31a may be 0%. The second open position refers to a position in which the inlet door 31 completely covers the outside air inlet 31b so that the outside air inlet 31b may be fully closed and the inside air inlet 31a may be fully opened. When the inlet door 31 is in the second open position, the opening amount of the outside air inlet 31b may be 0%, and the opening amount of the inside air inlet 31a may be 100%.

The plurality of outlets 32a, 32b, 32c, and 32d may include a defrost outlet 32a, a vent outlet 32b, a floor outlet 32c, and a rear seat outlet 32d.

Referring to FIG. 2, the defrost outlet 32a may be configured to direct the air toward a front windshield 5, and thus the air may be directed toward the front windshield 5 through the defrost outlet 32a. A defrost mode door 33a may be rotatably mounted in a position adjacent to the defrost outlet 32a within the HVAC casing 30. The defrost mode door 33a may adjust the opening amount of the defrost outlet 32a so that the airflow or the flow rate of air passing through the defrost outlet 32a may be varied.

Referring to FIG. 2, the vent outlet 32b may be configured to direct the air toward an occupant's face and chest, and thus the air may be directed toward the occupant through the vent outlet 32b. A vent mode door 33b may be rotatably mounted in a position adjacent to the vent outlet 32b within the HVAC casing 30. The vent mode door 33b may adjust the opening amount of the vent outlet 32b so that the airflow or the flow rate of air passing through the vent outlet 32b may be varied.

Referring to FIG. 2, the floor outlet 32c may be configured to direct the air toward a floor 6 of the vehicle, and thus the air may be directed toward the floor 6 of the vehicle through the floor outlet 32c. A floor mode door 33c may be rotatably mounted in a position adjacent to the floor outlet 32c within the HVAC casing 30. The floor mode door 33c may adjust the opening amount of the floor outlet 32c so that the airflow or the flow rate of air passing through the floor outlet 32c may be varied.

Referring to FIG. 1, the rear seat outlet 32d may be configured to direct the air toward the rear seat 8 in the passenger compartment 3, and thus the air may be directed toward the rear seat 8 through the rear seat outlet 32d.

An air blower 33 may be located on the upstream side of the evaporator 25 within the HVAC casing 30, and the air blower 33 may be adjacent to the inlets 31a and 31b. The air blower 33 may blow the air drawn in through the inlets 31a and 31b into the passenger compartment 3 through the HVAC casing 30.

Referring to FIG. 2, the HVAC casing 30 may have a top wall 30a facing the top portion of the vehicle, a bottom wall 30b facing the floor of the vehicle, a front wall 30c facing the front of the vehicle, and a rear wall 30d facing the rear of the vehicle. The front wall 30c may be adjacent to the inlets 31a and 31b, and the rear wall 30d may be adjacent to the plurality of outlets 32a, 32b, 32c, and 32d.

Referring to FIG. 1 and FIG. 2, an upper air mixing door 34 and a lower air mixing door 35 may be movably disposed between the evaporator 25 and the heater core 26. Thus, the evaporator 25, the plurality of air mixing doors 34 and 35, and the heater core 26 may be sequentially arranged within the HVAC casing 30 in an air flow direction from upstream to downstream.

Furthermore, the HVAC subsystem 11 may further include a partition 36 by which a space 13 of the HVAC casing 30 defined between the evaporator 25 and the heater core 26 includes an upper space 13a and a lower space 13b. The upper air mixing door 34 may be located above the partition 36. The upper air mixing door 34 may be movable in the upper space 13a. The lower air mixing door 35 may be located below the partition 36. The lower air mixing door 35 may be movable in the lower space 13b.

Referring to FIG. 2, the evaporator 25 and the heater core 26 may face each other in the HVAC casing 30, and the evaporator 25 and the heater core 26 may be parallel to each other. The evaporator 25 and the heater core 26 may be arranged in a line along the air flow direction within the HVAC casing 30, each of the evaporator 25 and the heater core 26 may be vertically upright, which is substantially perpendicular with respect to the air flow direction, and accordingly the length of the HVAC casing 30 may be relatively reduced. Thus, the miniaturization and weight reduction of the HVAC casing 30 may be effectively achieved. A top end portion of the heater core 26 may be spaced from the top portion wall 30a of the HVAC casing 30 so that an upper bypass passage 38a may be defined by the top portion of the heater core 26 and the top portion wall 30a of the HVAC casing 30. A bottom end portion of the heater core 26 may be spaced from the bottom wall 30*b* of the HVAC casing 30 so that a lower bypass passage 38*b* may be defined by the bottom end portion of the heater core 26 and the bottom wall 30*b* of the HVAC casing 30. Accordingly, the upper bypass passage 38*a* and the lower bypass passage 38*b* may be separated by the heater core 26 on the downstream side of the evaporator 25. The upper bypass passage 38*a* may be an upper air passage bypassing the heater core 26, and the lower bypass passage 38*b* may be a lower air passage bypassing the heater core 26. The upper bypass passage 38*a* and the lower bypass passage 38*b* may be straight passages guiding the air cooled by the evaporator 25 straightly. Accordingly, the height of the HVAC casing 30 may be relatively reduced compared to the related art, and thus the miniaturization and weight reduction of the HVAC casing 30 may be effectively achieved. Furthermore, air flow resistance may be reduced, and thus the airflow volume may be increased.

As described above, the evaporator 25 and the heater core 26 may be vertically upright, and the upper bypass passage 38*a* and the lower bypass passage 38*b* allowing the air cooled by the evaporator 25 to bypass the heater core 26 may be defined as the straight passages by the heater core 26 so that the evaporator 25, the heater core 26, and an air mixing chamber 39 behind the heater core 26 may be arranged in a line within the HVAC casing 30. Accordingly, the height and length of the HVAC casing 30 may be significantly reduced, and thus the miniaturization and weight reduction of the HVAC casing 30 may be effectively achieved.

The upper air mixing door 34 may be movably mounted along the upper bypass passage 38*a* and an upper portion of the heater core 26, adjusting the flow of the air passing through the upper bypass passage 38*a* and the upper portion of the heater core 26. The lower air mixing door 35 may be movably mounted along the lower bypass passage 38*b* and a lower portion of the heater core 26, adjusting the flow of the air passing through the lower bypass passage 38*b* and the lower portion of the heater core 26. The upper air mixing door 34 and the lower air mixing door 35 may rotate (pivot) or slide.

According to an exemplary embodiment of the present disclosure, the upper air mixing door 34 may be moved by a first pinion gear 14 in a straight direction, and a first actuator 14*a* (see FIG. 1) may rotate the first pinion gear 14. The upper air mixing door 34 may have a first rack 34*a* meshing with the first pinion gear 14, and the upper air mixing door 34 may slide along a substantially vertical direction by the first pinion gear 14 and the first rack 34*a*. The upper air mixing door 34 may intersect with the upper bypass passage 38*a* at a predetermined angle or be perpendicular to the upper bypass passage 38*a*. The upper air mixing door 34 may adjust the temperature of the air by selectively adjusting the amount of cooled air passing through the upper bypass passage 38*a* and/or the amount of heated air passing across the upper portion of the heater core 26. Referring to FIG. 2, when the upper air mixing door 34 moves downwardly, the opening amount of the upper bypass passage 38*a* may be relatively increased, and accordingly the flow rate of the air passing through the upper bypass passage 38*a* may be relatively increased, but on the other hand, the flow rate of the air passing across the upper portion of the heater core 26 may be relatively reduced. When the upper air mixing door 34 moves upwardly, the opening amount of the upper bypass passage 38*a* may be relatively reduced, and accordingly the flow rate of the air passing through the upper bypass passage 38*a* may be relatively reduced, but on the other hand, the flow rate of the air passing across the upper portion of the heater core 26 may be relatively increased.

According to an exemplary embodiment of the present disclosure, the lower air mixing door 35 may be moved by a second pinion gear 15 in a straight direction, and a second actuator 15*a* (see FIG. 1) may rotate the second pinion gear 15. The lower air mixing door 35 may have a second rack 35*a* meshing with the second pinion gear 15, and the lower air mixing door 35 may slide along a substantially vertical direction by the second pinion gear 15 and the second rack 35*a*. The lower air mixing door 35 may intersect with the lower bypass passage 38*b* at a predetermined angle or be perpendicular to the lower bypass passage 38*b*. The lower air mixing door 35 may adjust the temperature of the air by selectively adjusting the amount of cooled air passing through the lower bypass passage 38*b* and/or the amount of heated air passing across the lower portion of the heater core 26. Referring to FIG. 2, when the lower air mixing door 35 moves downwardly, the opening amount of the lower bypass passage 38*b* may be relatively reduced, and accordingly the flow rate of the air passing through the lower bypass passage 38*b* may be relatively reduced, but the flow rate of the air passing across the lower portion of the heater core 26 may be relatively increased. When the lower air mixing door 35 moves upwardly, the opening amount of the lower bypass passage 38*b* may be relatively increased, and accordingly the flow rate of the air passing through the lower bypass passage 38*b* may be relatively increased, but the flow rate of the air passing across the lower portion of the heater core 26 may be relatively reduced.

As the upper air mixing door 34 adjusts the opening amount of the upper bypass passage 38*a*, the flow rate of the air passing across the upper portion of the heater core 26 may be varied, and as the lower air mixing door 35 adjusts the opening amount of the lower bypass passage 38*b*, the flow rate of the air passing across the lower portion of the heater core 26 may be varied. The flow rate of the air passing across the upper portion of the heater core 26 and the flow rate of the air passing across the lower portion of the heater core 26 may be varied selectively and independently, and thus the performance of the HVAC subsystem 11 and the performance of the cooling subsystem may be flexibly adjusted according to the outside conditions of the vehicle or the user's requirements. Furthermore, under a specific condition, the performance of the HVAC subsystem 11 and the performance of the cooling subsystem may be improved at the same time. For example, when the HVAC subsystem 11 operates in a cooling mode, a flap 18 is in an open position, and the upper air mixing door 34 moves downwardly to adjust the opening amount of the upper bypass passage 38*a* to 100% (that is, the upper air mixing door 34 completely opens the upper bypass passage 38*a*), the air may not pass across the upper portion of the heater core 26 or the flow rate of the air passing across the upper portion of the heater core 26 may be minimized so that the flow rate of the air heated by the upper portion of the heater core 26 may be minimized, and thus the cooling performance or cooling capacity of the HVAC subsystem 11 may be maximized. When the lower air mixing door 35 moves downwardly to adjust the opening amount of the lower bypass passage 38*b* to 0% (that is, the lower air mixing door 35 completely closes the lower bypass passage 38*b*), the flow rate of the air passing across the lower portion of the heater core 26 may be maximized so that the air passing across the lower portion of the heater core 26 may absorb heat from the coolant flowing through the coolant passage of the heater core 26, and thus the coolant may be cooled. The air heated by the heater core 26 may be discharged to the outside of the vehicle through the air mixing chamber 39 and a discharge pipe 16. Thus, the cooling performance of the coolant circulating in the cooling subsystem may be improved, and the cooling of the passenger compartment 3 may not be affected.

The space 13 may be defined between the evaporator 25 and the heater core 26, and the partition 36 may be horizontally disposed between the evaporator 25 and the heater core 26. The partition 36 may divide the space 13 between the evaporator 25 and the heater core 26 into the upper space 13a and the lower space 13b. The upper air mixing door 34 may be movably disposed in the upper space 13a above the partition 36, and the lower air mixing door 35 may be movably disposed in the lower space 13b below the partition 36. Accordingly, the air having passed through the evaporator 25 may be distributed to the upper space 13a and the lower space 13b. As for the air distributed to the upper space 13a, the flow rate of the air passing across the upper portion of the heater core 26 may be appropriately adjusted by the movement of the upper air mixing door 34. As for the air distributed to the lower space 13b, the flow rate of the air passing across the lower portion of the heater core 26 may be appropriately adjusted by the movement of the lower air mixing door 35. Thus, the performance of the HVAC subsystem 11 and the performance of the cooling subsystem may be flexibly adjusted according to the outside conditions of the vehicle or the user's requirements.

Referring to FIG. 2, the air mixing chamber 39 may be defined on the downstream side of the heater core 26 inside the HVAC casing 30, and a rear door 37 may be rotatable by an actuator 37a such as a motor (see FIG. 1) inside the air mixing chamber 39. The air mixing chamber 39 may be divided into an upper air mixing chamber 39a fluidly connected to the upper bypass passage 38a and a lower air mixing chamber 39b fluidly connected to the lower bypass passage 38b. The rear door 37 may selectively separate the upper air mixing chamber 39a and the lower air mixing chamber 39b in the air mixing chamber 39. The rear door 37 may move between a separation position in which the rear door 37 allows the upper air mixing chamber 39a and the lower air mixing chamber 39b to be fluidly separated from each other (see a solid line of FIG. 2) and a communication position in which the rear door 37 allows the upper air mixing chamber 39a and the lower air mixing chamber 39b to fluidically-communicate with each other (see alternate long and two short dashes lines of FIG. 2).

The discharge pipe 16 may communicate with the air mixing chamber 39, and the discharge pipe 16 may be opened to the outside of the passenger compartment 3.

According to an exemplary embodiment of the present disclosure, the discharge pipe 16 may be connected to the rear seat outlet 32d. The flap 18 may be rotatable by an actuator 18a such as a motor (see FIG. 1) between the discharge pipe 16 and the rear seat outlet 32d, and thus the flap 18 may selectively open or close the discharge pipe 16 and the rear seat outlet 32d. The flap 18 may move between an open position in which the flap 18 completely opens the discharge pipe 16 (see a solid line of FIG. 2) and a closed position in which the flap 18 completely closes the discharge pipe 16 (see alternate long and two short dashes line of FIG. 2). The rear seat outlet 32d may be adjacent to the floor 6 of the vehicle, and the discharge pipe 16 may extend through the floor 6 of the vehicle. Accordingly, the discharge pipe 16 may be opened toward the bottom portion of the floor 6 of the vehicle. Because the discharge pipe 16 is opened to the bottom portion of the floor 6 of the vehicle, the air heated by the heater core 26 may be rapidly discharged to the outside of the vehicle through the discharge pipe 16 when the HVAC subsystem 11 operates in the cooling mode, minimizing an effect of heat on the cooling of the passenger compartment 3.

When the rear door 37 is in the separation position, the upper air mixing chamber 39a may be fluidly separated from the lower air mixing chamber 39b so that the air having passed through the upper bypass passage 38a and the air having passed through the upper portion of the heater core 26 may be appropriately mixed in the upper air mixing chamber 39a, and the air having passed through the lower bypass passage 38b and the air having passed through the lower portion of the heater core 26 may be appropriately mixed in the lower air mixing chamber 39b. When the rear door 37 is in the communication position, the air having passed through the upper bypass passage 38a, the air having passed through the upper portion of the heater core 26, the air having passed through the lower bypass passage 38b, and the air having passed through the lower portion of the heater core 26 may be entirely mixed in the air mixing chamber 39. For example, when the HVAC subsystem 11 operates in the cooling mode, the flap 18 opens the discharge pipe 16, and the rear door 37 is in the separation position, the lower air mixing chamber 39b may be fluidly separated from the upper air mixing chamber 39a, so that the air having passed through the upper air mixing chamber 39a may be directed toward the passenger compartment 3 through the plurality of outlets 32a, 32b, and 32c, and the air heated by the lower portion of the heater core 26 may be discharged to the outside of the passenger compartment 3 through the lower air mixing chamber 39b and the discharge pipe 16.

Furthermore, the HVAC subsystem 11 may further include a sealing member 26b disposed in the middle portion of the heater core 26. The position of the sealing member 26b may be a reference position for separating the upper portion and the lower portion of the heater core 26. When the rear door 37 is in the separation position, a free end portion of the rear door 37 may directly contact with the sealing member 26b so that the upper air mixing chamber 39a and the lower air mixing chamber 39b may be fluidly separated from each other.

Referring to FIG. 1 and FIG. 2, a positive temperature coefficient (PTC) heater 27 may be located on the upstream side of the heater core 26 inside the HVAC casing 30. When the HVAC subsystem 11 operates in a heating mode or it is necessary to heat the coolant of the cooling subsystem, the PTC heater 27 may be operated so that heat of the PTC heater 27 may be directly transferred to the heater core 26, and thus the heating performance of the heater core 26 with respect to the air and the coolant may be improved.

The HVAC casing 30 may include an upper support 17a supporting a top end portion of the PTC heater 27 and the top end portion of the heater core 26, and a lower support 17b supporting a bottom end portion of the PTC heater 27 and the bottom end portion of the heater core 26. The PTC heater 27 and the heater core 26 may be supported together by the upper support 17a and the lower support 17b in the HVAC casing 30 of the HVAC subsystem 11, and thus the assemblability of the PTC heater 27 and the heater core 26 may be improved.

The controller 100 may be configured to control individual components of the HVAC subsystem 11 and individual components of the cooling subsystem under various conditions. According to an exemplary embodiment of the present disclosure, the controller 100 may be a full automatic temperature control (FATC) system.

The cooling subsystem may be configured to cool various vehicle components using a coolant loop through which the coolant circulates. The vehicle components to be cooled by the cooling subsystem may be at least one of heat rejecting components that generate heat according to the operation of the vehicle, such as an internal combustion engine (a prime mover of a mechanical powertrain), power electronics (an electric motor, an inverter, and an on-board charger (OBC) of an electric powertrain), a battery pack, and various coolers (an oil cooler, a transmission cooler, an exhaust gas recirculation (EGR) cooler, etc.).

According to the above-described exemplary embodiment of the present disclosure, when the cooling performance or cooling capacity of the cooling subsystem does not meet a cooling load for the vehicle components (the internal combustion engine, the power electronics, the battery pack, various coolers, a turbocharger, etc.), the coolant circulating in the coolant loop of the cooling subsystem may be supplementarily or additionally cooled by the heater core, and thus the cooling performance of the cooling subsystem may be improved, and the performance of the HVAC subsystem may be kept constant.

When the HVAC subsystem 11 operates in the cooling mode, the cooling load for the vehicle components may relatively increase. When the cooling subsystem fails to meet the increased cooling load, the coolant may be supplementarily or additionally cooled by the heater core 26. When the HVAC subsystem 11 operates in the cooling mode, the flap 18 is in the open position (see the solid line of FIG. 2), and the rear door 37 is in the separation position (see the solid line of FIG. 2), the upper air mixing door 34 may appropriately adjust the opening amount of the upper bypass passage 38a to meet a required cooling temperature set by the occupant. After the air distributed to the upper space 13a passes through the upper bypass passage 38a and the upper portion of the heater core 26, it may be appropriately mixed in the upper air mixing chamber 39a. The air mixed in the upper air mixing chamber 39a may be directed toward the passenger compartment 3 through the defrost outlet 32a, the vent outlet 32b, and the floor outlet 32c. As the lower air mixing door 35 completely closes the lower bypass passage 38b, the air distributed to the lower space 13b may only pass across the lower portion of the heater core 26. The air passing across the lower portion of the heater core 26 may absorb heat from the coolant flowing through the coolant passage of the heater core 26. As a result, while the coolant is cooled, the air may be heated. The air heated by the lower portion of the heater core 26 may be discharged to the outside of the passenger compartment 3 through the lower air mixing chamber 39b and the discharge pipe 16, and thus it may not affect the cooling performance of the HVAC subsystem 11.

Figure 6:
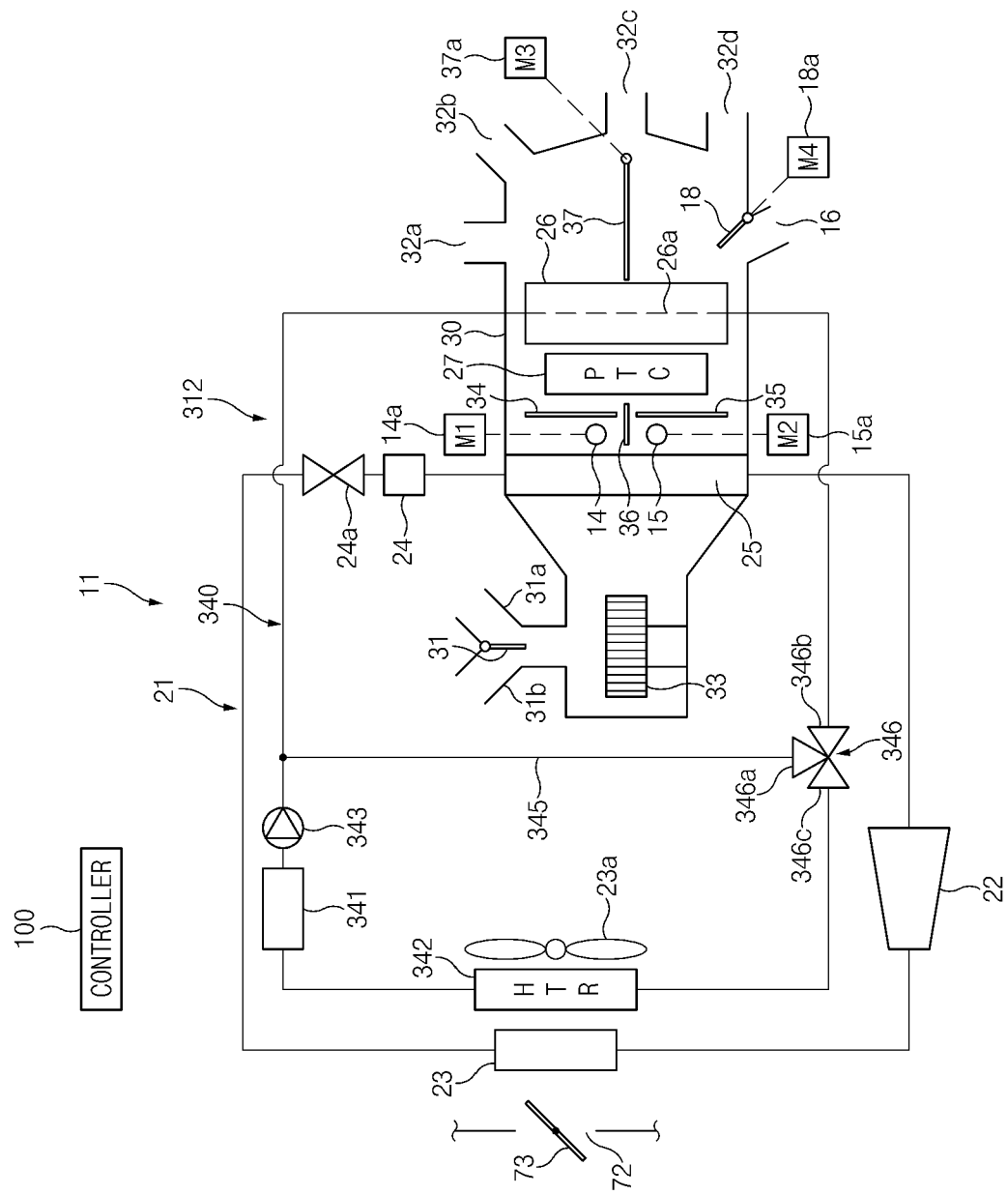
FIG. 6 illustrates a cooling subsystem of a vehicle thermal management system according to an exemplary embodiment of the present disclosure, which is applied to a power electronics cooling system.
Figure 7:
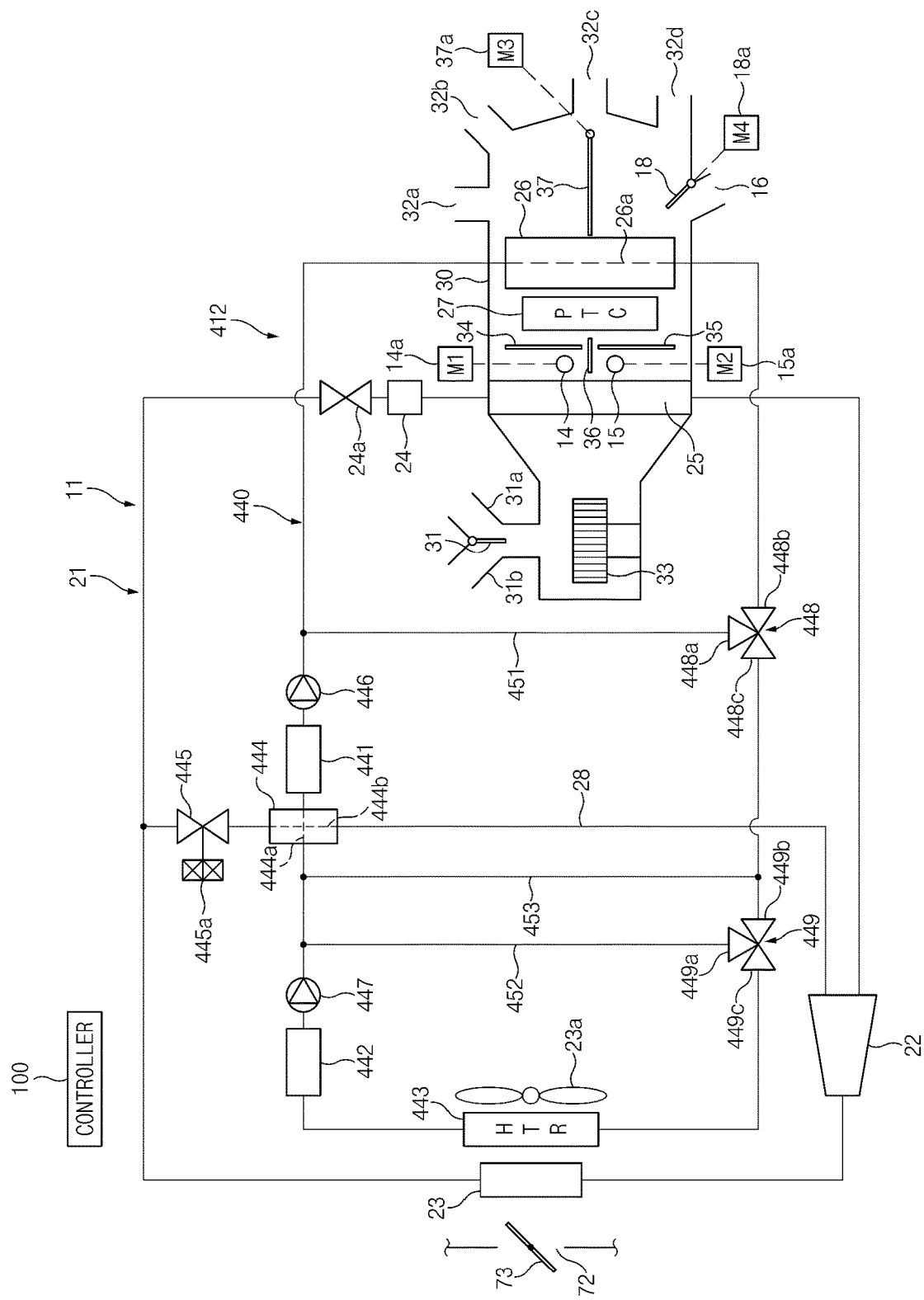
FIG. 7 illustrates a cooling subsystem of a vehicle thermal management system according to an exemplary embodiment of the present disclosure, which is applied to a battery-power electronics cooling system.

The cooling subsystem may be at least one of an internal combustion engine cooling system 12 for cooling an internal combustion engine 51 (see FIG. 3), a battery cooling system 112 (see FIG. 4), a battery cooling system 212 including a battery radiator (see FIG. 5), a power electronics cooling system 312 (see FIG. 6), and a battery-power electronics cooling system 412 (see FIG. 7).

Figure 3:
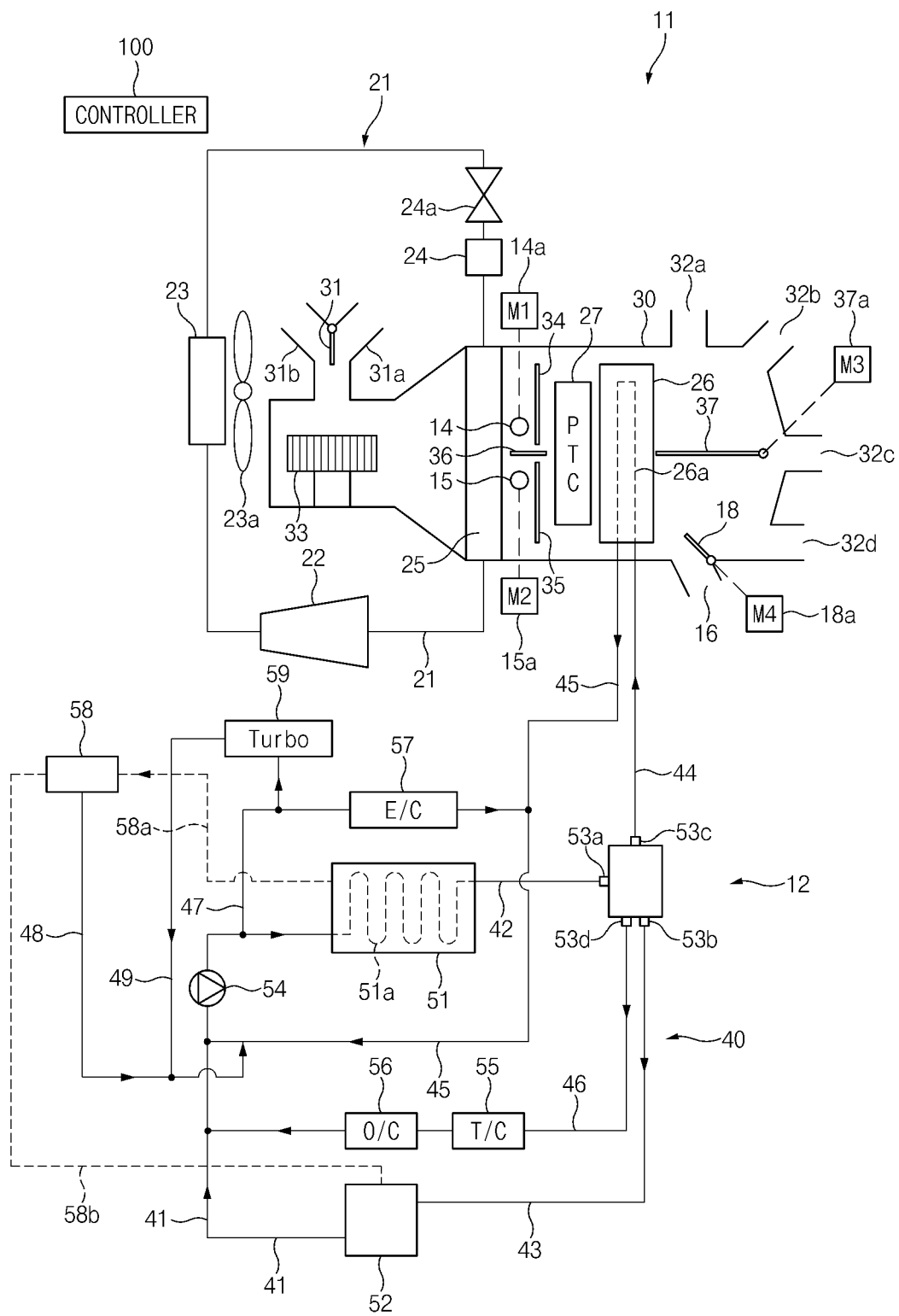
FIG. 3 illustrates a cooling subsystem of a vehicle thermal management system according to an exemplary embodiment of the present disclosure, which is applied to an internal combustion engine cooling system.

The vehicle thermal management system 10 according to an exemplary embodiment of the present disclosure may be applied to an internal combustion engine vehicle. Referring to FIG. 3, the cooling subsystem may be the internal combustion engine cooling system 12 configured to cool the internal combustion engine 51, a transmission cooler 55, an oil cooler 56, an exhaust gas recirculation (EGR) cooler 57, and a turbocharger 59.

The internal combustion engine cooling system 12 may be fluidly connected to the heater core 26 through a coolant loop 40. The coolant loop 40 may be fluidly connected to the internal combustion engine 51, an internal combustion engine radiator 52, a coolant control valve 53, a coolant pump 54, the heater core 26, the transmission cooler 55, the oil cooler 56, and the exhaust gas recirculation (EGR) cooler 57. The internal combustion engine 51 may have a water jacket 51a through which the coolant passes. The internal combustion engine radiator 52 together with the condenser 23 of the HVAC subsystem 11 may be disposed adjacent to the front grille of the vehicle. Furthermore, the internal combustion engine radiator 52 may exchange heat with the ambient air forcibly blown by the cooling fan 23a disposed behind the condenser 23 so that a heat transfer rate between the internal combustion engine radiator 52 and the ambient air may be increased. The coolant pump 54 may forcibly pump the coolant.

The coolant control valve 53 may include an inlet port 53a fluidly connected to an outlet of the water jacket 51a of the internal combustion engine 51, a first outlet port 53b fluidly connected to an inlet of the internal combustion engine radiator 52, a second outlet port 53c fluidly connected to an inlet of the coolant passage 26a of the heater core 26, and a third outlet port 53d fluidly connected to the transmission cooler 55 and the oil cooler 56.

The coolant loop 40 may include a first coolant conduit 41 by which an inlet of the water jacket 51a of the internal combustion engine 51 and an outlet of the internal combustion engine radiator 52 are fluidly connected, a second coolant conduit 42 by which the outlet of the water jacket 51a of the internal combustion engine 51 and the inlet port 53a of the coolant control valve 53 are fluidly connected, a third coolant conduit 43 by which the first outlet port 53b of the coolant control valve 53 and the internal combustion engine radiator 52 are fluidly connected, a fourth coolant conduit 44 by which the second outlet port 53c of the coolant control valve 53 and the coolant passage 26a of the heater core 26 are fluidly connected, and a fifth coolant conduit 45 by which the coolant passage 26a of the heater core 26 and the first coolant conduit 41 are fluidly connected.

Furthermore, the coolant loop 40 may include a sixth coolant conduit 46 by which the third outlet port 53d of the coolant control valve 53 and the first coolant conduit 41 are fluidly connected, and a seventh coolant conduit 47 by which the first coolant conduit 41 and the fifth coolant conduit 45 are fluidly connected.

A degassing box 58 may be fluidly connected to the water jacket 51a of the internal combustion engine 51 through a first degassing line 58a. Gas (that is, degassing gas) generated as the coolant evaporates in the water jacket 51a of the internal combustion engine 51 may be delivered to the degassing box 58 through the first degassing line 58a.

The degassing box 58 may be fluidly connected to the internal combustion engine radiator 52 through a second degassing line 58b. Gas (that is, degassing gas) generated as the coolant evaporates in the internal combustion engine radiator 52 may be delivered to the degassing box 58 through the second degassing line 58b.

The coolant loop 40 may include an eighth coolant conduit 48 by which the degassing box 58 and the fifth coolant conduit 45 are fluidly connected, and a ninth coolant conduit 49 by which the seventh coolant conduit 47 and the eighth coolant conduit 48 are fluidly connected. A coolant passage of the turbocharger 59 may be fluidly connected to the ninth coolant conduit 49.

In the internal combustion engine cooling system 12 illustrated in FIG. 3, when auxiliary or additional cooling of the internal combustion engine 51, the coolers 55, 56, and 57, and the turbocharger 59 is required, the coolant may flow through the coolant passage 26*a* of the heater core 26 by the operation of the coolant control valve 53. Here, as the air cooled by the evaporator 25 additionally cools the coolant flowing through the coolant passage 26*a* of the heater core 26, the cooled coolant may supplementarily or additionally cool the internal combustion engine 51, the coolers 55, 56, and 57, and the turbocharger 59. Heat rejection of the internal combustion engine radiator 52 may be relatively reduced, and thus the size of the internal combustion engine radiator 52 and the size of the cooling fan 23 *a* may be reduced. For example, when heat rejection of the internal combustion engine radiator 52 is 40 kW, the heater core 26 may appropriately cool the coolant so that heat rejection obtained by the heater core 26 may reach 5.1-7.2 kW. Accordingly, the heat rejection of the internal combustion engine radiator 52 may be reduced to 32.5-34.6 Kw, and thus the size of the internal combustion engine radiator 52 and the size of the cooling fan 23*a* may be significantly reduced.

Furthermore, when it is necessary to increase (warm-up) the temperatures of the internal combustion engine 51, the coolers 55, 56, and 57, and the turbocharger 59 in winter or in a cold start condition of the vehicle, the PTC heater 27 may be operated so that the coolant flowing through the coolant passage 26*a* of the heater core 26 may be heated by the PTC heater 27. Accordingly, the heated coolant may increase the temperatures of the internal combustion engine 51, the coolers 55, 56, and 57, and the turbocharger 59.

Figure 4:
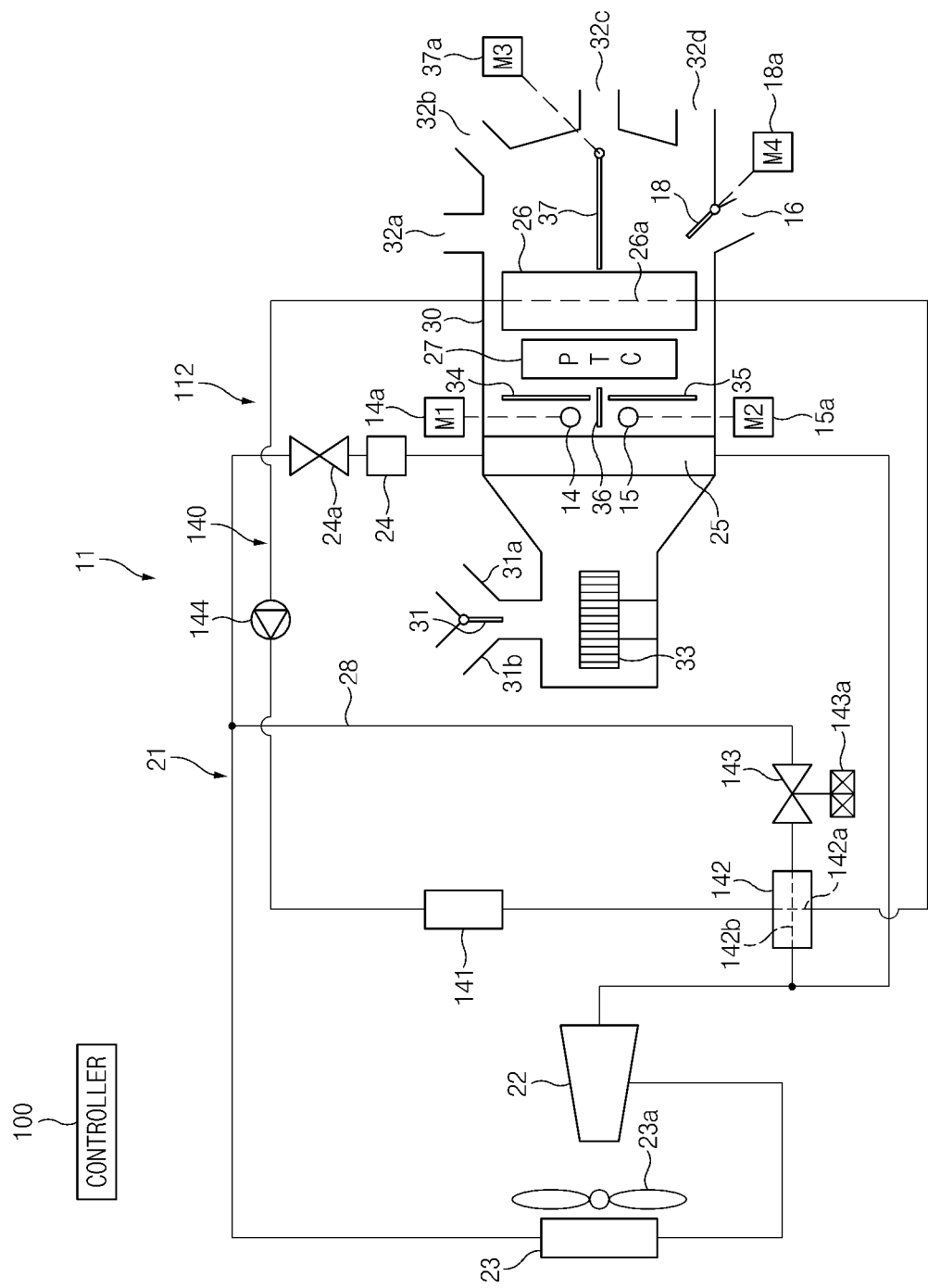
FIG. 4 illustrates a cooling subsystem of a vehicle thermal management system according to an exemplary embodiment of the present disclosure, which is applied to a battery cooling system.

The vehicle thermal management system 10 according to an exemplary embodiment of the present disclosure may be applied to an electric vehicle. Referring to FIG. 4, the cooling subsystem may be the battery cooling system 112 configured to cool a battery pack 141 of the electric vehicle.

The battery cooling system 112 may include a coolant loop 140 through which the coolant circulates. The coolant loop 140 may be fluidly connected to the heater core 26, the battery pack 141, a battery chiller 142, and a circulating pump 144.

The battery pack 141 may have a coolant passage provided inside or outside thereof, and the coolant may flow through the coolant passage of the battery pack 141. The coolant loop 140 may be fluidly connected to the coolant passage of the battery pack 141.

The HVAC subsystem 11 may include a branch conduit 28 branching off from the refrigerant loop 21. The branch conduit 28 may branch off from an upstream point of the expansion valve 24 and be fluidly connected to the compressor 22 in the refrigerant loop 21.

The battery chiller 142 may be configured to transfer heat between the coolant loop 140 and the branch conduit 28 of the refrigerant loop 21. The battery chiller 142 may be located on the downstream side of the battery pack 141, and the battery chiller 142 may cool the coolant circulating in the coolant loop 140 using the refrigerant flowing through the branch conduit 28 of the refrigerant loop 21.

The battery chiller 142 may include a first passage 142*a* fluidly connected to the coolant loop 140, and a second passage 142*b* fluidly connected to the branch conduit 28 of the refrigerant loop 21. The first passage 142*a* and the second passage 142*b* may be adjacent to each other or contact each other in the battery chiller 142, and the first passage 142*a* may be fluidly separated from the second passage 142*b*. Accordingly, the battery chiller 142 may transfer heat between the coolant flowing through the first passage 142*a* and the refrigerant flowing through the second passage 142*b*.

A chiller-side expansion valve 143 may be located on the upstream side of the battery chiller 142 in the branch conduit 28, and the chiller-side expansion valve 143 may adjust the flow of the refrigerant or the flow rate of the refrigerant into the second passage 142*b* of the battery chiller 142. The chiller-side expansion valve 143 may expand the refrigerant received from the condenser 23 of the HVAC subsystem 11.

According to an exemplary embodiment of the present disclosure, the chiller-side expansion valve 143 may be an electronic expansion valve (EXV) including a drive motor 143*a*. The drive motor 143*a* may have a shaft which is movable to open or close an orifice defined in a valve body of the chiller-side expansion valve 143, and the position of the shaft may be varied depending on the rotation direction, rotation degree, and the like of the drive motor 143*a*, and thus the opening amount of the chiller-side expansion valve 143 may be varied. That is, as the controller 100 controls the operation of the drive motor 143*a*, the opening amount of the chiller-side expansion valve 143 may be varied. The chiller-side expansion valve 143 may be a full open type EXV.

The circulating pump 144 may force the coolant to circulate through the coolant loop 140. The circulating pump 144 may be located between the heater core 26 and the battery pack 141.

In the battery cooling system 112 illustrated in FIG. 4, when the coolant passes through the coolant passage 26*a* of the heater core 26, the air cooled by the evaporator 25 may cool the coolant flowing through the coolant passage 26*a* of the heater core 26 so that the coolant may be cooled. The cooled coolant may cool the battery pack 141. That is, the heater core 26 may replace a radiator of a battery cooling system of an electric vehicle according to the related art, simplifying the layout of the battery cooling system 112, and reducing the manufacturing cost thereof.

Furthermore, when it is necessary to increase (warm-up) the temperature of the battery pack 141 in winter or in a cold start condition of the vehicle, the PTC heater 27 may be operated so that the coolant flowing through the coolant passage 26*a* of the heater core 26 may be heated by the PTC heater 27. Accordingly, the heated coolant may increase the temperature of the battery pack 141. That is, the PTC heater 27 may replace a heater (for increasing a battery temperature) of the battery cooling system of the electric vehicle according to the related art, simplifying the layout of the battery cooling system 112, and reducing the manufacturing cost thereof.

Figure 5:
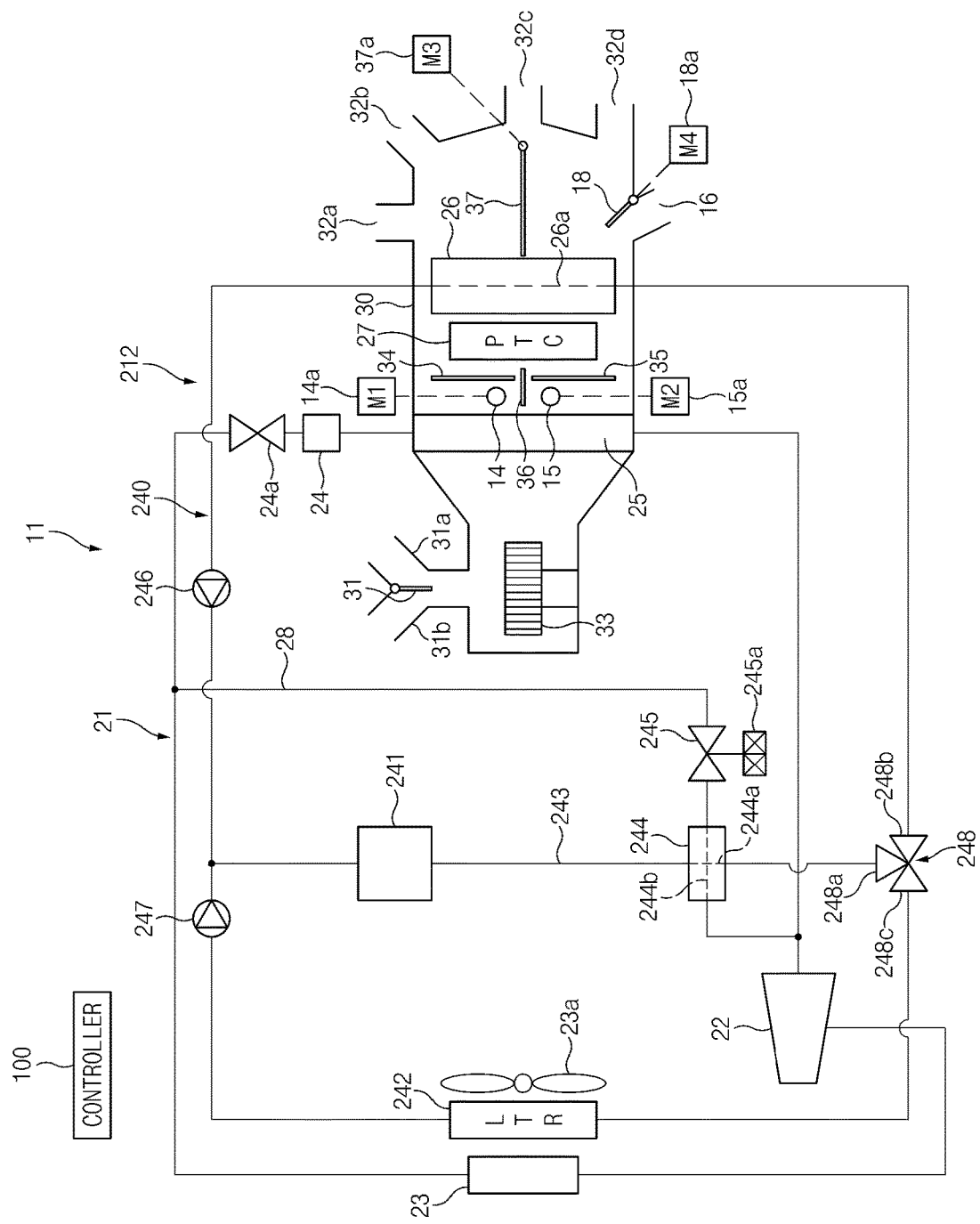
FIG. 5 illustrates a cooling subsystem of a vehicle thermal management system according to an exemplary embodiment of the present disclosure, which is applied to a battery cooling system including a battery radiator.

The vehicle thermal management system 10 according to an exemplary embodiment of the present disclosure may be applied to an electric vehicle. Referring to FIG. 5, the cooling subsystem may be a battery cooling system 212 configured to cool a battery pack 241 of the electric vehicle using a battery radiator 242.

The battery cooling system 212 may include a coolant loop 240 through which the coolant circulates. The coolant loop 240 may be fluidly connected to the heater core 26, the battery pack 241, the battery radiator 242, a battery chiller 244, a first circulating pump 246, and a second circulating pump 247.

The battery cooling system 212 may include a branch conduit 243 for connecting the battery radiator 242 and the battery pack 241 in parallel with respect to the coolant passage 26*a* of the heater core 26, and the battery pack 241 may be disposed in the branch conduit 243. The battery pack 241 may have a coolant passage inside or outside thereof, and the coolant may flow through the coolant passage of the battery pack 241. The coolant loop 240 may be fluidly connected to the coolant passage of the battery pack 241 through the branch conduit 243.

An inlet of the branch conduit 243 may be connected to a point between an outlet of the battery radiator 242 and an outlet of the coolant passage 26a of the heater core 26 in the coolant loop 240, and an outlet of the branch conduit 243 may be connected to a point between an inlet of the battery radiator 242 and an inlet of the coolant passage 26a of the heater core 26 in the coolant loop 240.

The battery radiator 242 may be a low temperature radiator, and the battery radiator 242 together with the condenser 23 of the HVAC subsystem 11 may be disposed adjacent to the front grille of the vehicle. The cooling fan 23a may be located behind the condenser 23 and the battery radiator 242. The condenser 23 and the battery radiator 242 may exchange heat with the ambient air forcibly blown by the cooling fan 23a so that a heat transfer rate between the condenser 23 and the ambient air and between the battery radiator 242 and the ambient air may be further increased.

The first circulating pump 246 may force the coolant to circulate between the heater core 26 and the battery pack 241. The first circulating pump 246 may be located between the outlet of the coolant passage 26a of the heater core 26 and the inlet of the branch conduit 243 in the coolant loop 240.

The second circulating pump 247 may force the coolant to circulate between the battery pack 241 and the battery radiator 242. The second circulating pump 247 may be located between the outlet of the battery radiator 242 and the inlet of the branch conduit 243 in the coolant loop 240.

A three-way valve 248 may be disposed at the outlet of the branch conduit 243. The three-way valve 248 may include a first port 248a fluidly connected to the branch conduit 243, a second port 248b fluidly connected to the inlet of the coolant passage 26a of the heater core 26, and a third port 248c fluidly connected to the inlet of the battery radiator 242. The three-way valve 248 may be configured to perform a switching operation by a drive motor to allow the second port 248b and the third port 248c to selectively communicate with the first port 248a. For example, when the three-way valve 248 is switched to allow the second port 248b to fluidically communicate with the first port 248a, the third port 248c may be closed. As the first circulating pump 246 operates, the coolant may circulate between the coolant passage 26a of the heater core 26 and the battery pack 241, and the coolant may be cooled by the heater core 26. The coolant cooled by the heater core 26 may cool the battery pack 241. When the three-way valve 248 is switched to allow the third port 248c to fluidically communicate with the first port 248a, the second port 248b may be closed. As the second circulating pump 247 operates, the coolant may circulate between the battery radiator 242 and the battery pack 241, and the coolant may be cooled by the battery radiator 242. The coolant cooled by the battery radiator 242 may cool the battery pack 241.

The battery chiller 244 may be configured to transfer heat between the branch conduit 243 of the coolant loop 240 and the branch conduit 28 of the refrigerant loop 21. The battery chiller 244 may be located on the downstream side of the battery pack 241, and the battery chiller 244 may be configured to cool the coolant flowing through the branch conduit 243 of the coolant loop 240 using the refrigerant flowing through the branch conduit 28 of the refrigerant loop 21.

The battery chiller 244 may include a first passage 244a fluidly connected to the coolant loop 240, and a second passage 244b fluidly connected to the branch conduit 28 of the refrigerant loop 21. The first passage 244a and the second passage 244b may be adjacent to each other or contact each other in the battery chiller 244, and the first passage 244a may be fluidly separated from the second passage 244b. Accordingly, the battery chiller 244 may transfer heat between the coolant flowing through the first passage 244a and the refrigerant flowing through the second passage 244b.

A chiller-side expansion valve 245 may be located on the upstream side of the battery chiller 244 in the branch conduit 28, and the chiller-side expansion valve 245 may adjust the flow of the refrigerant or the flow rate of the refrigerant into the second passage 244b of the battery chiller 244. The chiller-side expansion valve 245 may expand the refrigerant received from the condenser 23 of the HVAC subsystem 11.

According to an exemplary embodiment of the present disclosure, the chiller-side expansion valve 245 may be an electronic expansion valve (EXV) including a drive motor 245a. The drive motor 245a may have a shaft which is movable to open or close an orifice defined in a valve body of the chiller-side expansion valve 245, and the position of the shaft may be varied depending on the rotation direction, rotation degree, and the like of the drive motor 245a, and thus the opening amount of the chiller-side expansion valve 245 may be varied. That is, as the controller 100 controls the operation of the drive motor 245a, the opening amount of the chiller-side expansion valve 245 may be varied. The chiller-side expansion valve 245 may be a full open type EXV.

In the battery cooling system 212 illustrated in FIG. 5, when the coolant passes through the coolant passage 26a of the heater core 26 by the switching operation of the three-way valve 248, the air cooled by the evaporator 25 may cool the coolant flowing through the coolant passage 26a of the heater core 26 so that the coolant may be supplementarily or additionally cooled. Thus, the performance of the battery cooling system 212 for cooling the battery pack 241 may be improved. For example, when the cooling of the battery pack 241 of the electric vehicle is insufficient, the coolant may be additionally cooled by the heater core 26, supplementing the performance of the battery cooling system 212 for cooling the battery pack 241.

Furthermore, when the cooling of the battery pack 241 and the heating of the passenger compartment are required simultaneously in winter, the coolant may bypass the coolant passage 26a of the heater core 26 and flow through the battery radiator 242 by the switching operation of the three-way valve 248. Here, the battery pack 241 may only be cooled by the battery radiator 242, and the heating of the passenger compartment may be performed by the operation of the PTC heater 27 or the heating operation of the HVAC subsystem.

The vehicle thermal management system 10 according to an exemplary embodiment of the present disclosure may be applied to an electric vehicle. Referring to FIG. 6, the cooling subsystem may be the power electronics cooling system 312 configured to cool power electronics 341 of the electric vehicle.

The power electronics cooling system 312 may include a coolant loop 340 through which the coolant circulates. The coolant loop 340 may be fluidly connected to the heater core 26, the power electronics 341, a power electronics radiator 342, and a circulating pump 343.

The power electronics 341 may include components of an electric powertrain such as an electric motor, an inverter, and an on-board charger (OBC). The power electronics 341 may have a coolant passage provided inside or outside thereof, and the coolant may flow through the coolant passage of the power electronics 341. The coolant loop 340 may be fluidly connected to the coolant passage of the power electronics 341.

The power electronics radiator 342 may be a high temperature radiator. The power electronics radiator 342 together with the condenser 23 of the HVAC subsystem 11 may be disposed adjacent to a front grille 72 of the vehicle. The front grille 72 of the vehicle may be selectively opened or closed by an active air flap 73. The cooling fan 23a may be located behind the condenser 23 and the power electronics radiator 342. The condenser 23 and the power electronics radiator 342 may exchange heat with the ambient air forcibly blown by the cooling fan 23a so that a heat transfer rate between the condenser 23 and the ambient air and between the power electronics radiator 342 and the ambient air may be further increased.

The circulating pump 343 may force the coolant to circulate between the heater core 26, the power electronics 341, and the power electronics radiator 342. The circulating pump 343 may be located between the power electronics 341 and the inlet of the coolant passage 26a of the heater core 26 in the coolant loop 340.

The power electronics cooling system 312 may include a bypass conduit 345 allowing the coolant to bypass the coolant passage 26a of the heater core 26. An inlet of the bypass conduit 345 may be connected to a point between an outlet of the circulating pump 343 and the inlet of the coolant passage 26a of the heater core 26 in the coolant loop 340, and an outlet of the bypass conduit 345 may be connected to a point between the outlet of the coolant passage 26a of the heater core 26 and the power electronics radiator 342 in the coolant loop 340.

A three-way valve 346 may be disposed at the outlet of the bypass conduit 345. The three-way valve 346 may include a first port 346a fluidly connected to the bypass conduit 345, a second port 346b fluidly connected to the outlet of the coolant passage 26a of the heater core 26, and a third port 346c fluidly connected to an inlet of the power electronics radiator 342. The three-way valve 346 may be configured to perform a switching operation by a drive motor to allow the first port 346a and the second port 346b to selectively communicate with the third port 346c. For example, when the three-way valve 346 is switched to allow the second port 346b to fluidically communicate with the third port 346c, the first port 346a may be closed. As the circulating pump 343 operates, the coolant may circulate through the coolant passage 26a of the heater core 26, the power electronics radiator 342, and the power electronics 341. The coolant may be cooled by the heater core 26 and the power electronics radiator 342, and the coolant cooled by the heater core 26 and the power electronics radiator 342 may cool the power electronics 341. When the three-way valve 346 is switched to allow the first port 346a to fluidically communicate with the third port 346c, the second port 346b may be closed. As the circulating pump 343 operates, the coolant may circulate between the power electronics 341 and the power electronics radiator 342, and the coolant may bypass the heater core 26. Accordingly, the coolant may only be cooled by the power electronics radiator 342, and the coolant cooled by the power electronics radiator 342 may cool the power electronics 341.

In the power electronics cooling system 312 illustrated in FIG. 6, the coolant may selectively flow through the coolant passage 26a of the heater core 26 by the switching operation of the three-way valve 346, and the air cooled by the evaporator 25 may cool the coolant flowing through the coolant passage 26a of the heater core 26 so that the coolant may be supplementarily or additionally cooled. Thus, the performance of the power electronics cooling system 312 for cooling the power electronics 341 may be improved. For example, when the cooling of the power electronics 341 of the electric vehicle is insufficient, the coolant may be additionally cooled by the heater core 26, supplementing the performance of the power electronics cooling system 312 for cooling the power electronics 341.

Furthermore, when the heating of the passenger compartment is required in winter, the three-way valve 346 may be switched to allow the second port 346b to fluidically communicate with the third port 346c. As the circulating pump 343 operates, the coolant may sequentially flow through the power electronics radiator 342, the power electronics 341, and the coolant passage 26a of the heater core 26. Accordingly, waste heat of the power electronics 341 may be transferred to the air passing through the HVAC casing 30 through the heater core 26, improving interior heating efficiency. Here, as the active air flap 73 closes the front grille 72 of the vehicle, and the cooling fan 23a is stopped, the power electronics radiator 342 may minimize heat exchange with the ambient air so that the waste heat of the power electronics 341 may be efficiently transferred to the heater core 26 without heat leakage. When the heating of the passenger compartment is performed by the waste heat of the power electronics 341, the operation of the PTC heater 27 may be stopped or minimized, and thus power consumption may be significantly reduced.

The vehicle thermal management system 10 according to an exemplary embodiment of the present disclosure may be applied to an electric vehicle. Referring to FIG. 7, the cooling subsystem may be the battery-power electronics cooling system 412 configured to cool a battery pack 441 and power electronics 442 of the electric vehicle.

The battery-power electronics cooling system 412 may include a coolant loop 440 through which the coolant circulates. The coolant loop 440 may be fluidly connected to the battery pack 441, the power electronics 442, a coolant radiator 443, a battery chiller 444, a first circulating pump 446, and a second circulating pump 447.

The battery pack 441 may have a coolant passage provided inside or outside thereof, and the coolant may flow through the coolant passage of the battery pack 441. The coolant loop 440 may be fluidly connected to the coolant passage of the battery pack 441.

The power electronics 442 may include components of an electric powertrain such as an electric motor, an inverter, and an on-board charger (OBC). The power electronics 442 may have a coolant passage provided inside or outside thereof, and the coolant may flow through the coolant passage of the power electronics 442. The coolant loop 440 may be fluidly connected to the coolant passage of the power electronics 442.

The coolant radiator 443 may be a high temperature radiator. The coolant radiator 443 together with the condenser 23 of the HVAC subsystem 11 may be disposed adjacent to the front grille 72 of the vehicle. The front grille 72 of the vehicle may be selectively opened or closed by the active air flap 73. The cooling fan 23a may be located behind the condenser 23 and the coolant radiator 443. The condenser 23 and the coolant radiator 443 may exchange heat with the ambient air forcibly blown by the cooling fan 23*a* so that a heat transfer rate between the condenser 23 and the ambient air and between the coolant radiator 443 and the ambient air may be further increased.

The battery chiller 444 may be configured to transfer heat between the coolant loop 440 and the branch conduit 28 of the refrigerant loop 21. The battery chiller 444 may cool the coolant circulating in the coolant loop 440 using the refrigerant flowing through the branch conduit 28 of the refrigerant loop 21.

The battery chiller 444 may include a first passage 444*a* fluidly connected to the coolant loop 440, and a second passage 444*b* fluidly connected to the branch conduit 28 of the refrigerant loop 21. The first passage 444*a* and the second passage 444*b* may be adjacent to each other or contact each other in the battery chiller 444, and the first passage 444*a* may be fluidly separated from the second passage 444*b*. Accordingly, the battery chiller 444 may transfer heat between the coolant flowing through the first passage 444*a* and the refrigerant flowing through the second passage 444*b*.

A chiller-side expansion valve 445 may be located on the upstream side of the battery chiller 444 in the branch conduit 28, and the chiller-side expansion valve 445 may adjust the flow of the refrigerant or the flow rate of the refrigerant into the second passage 444*b* of the battery chiller 444. The chiller-side expansion valve 445 may expand the refrigerant received from the condenser 23 of the HVAC subsystem 11.

According to an exemplary embodiment of the present disclosure, the chiller-side expansion valve 445 may be an electronic expansion valve (EXV) including a drive motor 445*a*. The drive motor 445*a* may have a shaft which is movable to open or close an orifice defined in a valve body of the chiller-side expansion valve 445, and the position of the shaft may be varied depending on the rotation direction, rotation degree, and the like of the drive motor 445*a*, and thus the opening amount of the chiller-side expansion valve 445 may be varied. That is, as the controller 100 controls the operation of the drive motor 445*a*, the opening amount of the chiller-side expansion valve 445 may be varied. The chiller-side expansion valve 445 may be a full open type EXV.

The first circulating pump 446 may force the coolant to circulate between the battery pack 441 and the battery chiller 444. The first circulating pump 446 may be located between the battery pack 441 and the heater core 26 in the coolant loop 440.

The second circulating pump 447 may force the coolant to circulate between the power electronics 442 and the coolant radiator 443. The second circulating pump 447 may be located between the power electronics 442 and the battery chiller 444 in the coolant loop 440.

The battery-power electronics cooling system 412 may include a first bypass conduit 451 allowing the coolant to bypass the coolant passage 26*a* of the heater core 26, a second bypass conduit 452 allowing the coolant to bypass the battery pack 441, the battery chiller 444, and the heater core 26, and a third bypass conduit 453 located between the first bypass conduit 451 and the second bypass conduit 452.

An inlet of the first bypass conduit 451 may be connected to a point between an outlet of the first circulating pump 446 and the inlet of the coolant passage 26*a* of the heater core 26 in the coolant loop 440, and an outlet of the first bypass conduit 451 may be connected to a point between the outlet of the coolant passage 26*a* of the heater core 26 and the coolant radiator 443 in the coolant loop 440.

An inlet of the second bypass conduit 452 may be connected to a point between an outlet of the second circulating pump 447 and the battery chiller 444 in the coolant loop 440, and an outlet of the second bypass conduit 452 may be connected to a point between an inlet of the coolant radiator 443 and the outlet of the coolant passage 26*a* of the heater core 26 in the coolant loop 440.

An inlet of the third bypass conduit 453 may be connected to a point between the inlet of the first bypass conduit 451 and the inlet of the second bypass conduit 452. The inlet of the third bypass conduit 453 may be located on the upstream side of the first passage 444*a* of the battery chiller 444. An outlet of the third bypass conduit 453 may be connected to a point between the outlet of the first bypass conduit 451 and the outlet of the second bypass conduit 452. The outlet of the third bypass conduit 453 may be located between a first three-way valve 448 and a second three-way valve 449 to be described below.

The first three-way valve 448 may be disposed at the outlet of the first bypass conduit 451. The first three-way valve 448 may include a first port 448*a* fluidly connected to the first bypass conduit 451, a second port 448*b* fluidly connected to the outlet of the coolant passage 26*a* of the heater core 26, and a third port 448*c* fluidly connected to the inlet of the coolant radiator 443. The first three-way valve 448 may be configured to perform a switching operation by a drive motor to allow the first port 448*a* and the second port 448*b* to selectively communicate with the third port 448*c*. When the first three-way valve 448 is switched to allow the second port 448*b* to fluidically communicate with the third port 448*c*, the first port 448*a* may be closed. When the first three-way valve 448 is switched to allow the first port 448*a* to fluidically communicate with the third port 448*c*, the second port 448*b* may be closed.

The second three-way valve 449 may be disposed at the outlet of the second bypass conduit 452. The second three-way valve 449 may include a first port 449*a* fluidly connected to the second bypass conduit 452, a second port 449*b* fluidly connected to the third port 448*c* of the first three-way valve 448, and a third port 449*c* fluidly connected to the inlet of the coolant radiator 443. The second three-way valve 449 may be configured to perform a switching operation by a drive motor to allow the first port 449*a* and the second port 449*b* to selectively communicate with the third port 449*c*. When the second three-way valve 449 is switched to allow the second port 449*b* to fluidically communicate with the third port 449*c*, the first port 449*a* may be closed. When the second three-way valve 449 is switched to allow the first port 449*a* to fluidically communicate with the third port 449*c*, the second port 449*b* may be closed.

When the first three-way valve 448 is switched to allow the second port 448*b* to fluidically communicate with the third port 448*c*, and the second three-way valve 449 is switched to allow the second port 449*b* to fluidically communicate with the third port 449*c*, the coolant may circulate through a single integrated circulation path. As the first circulating pump 446 and/or the second circulating pump 447 operates, the coolant may sequentially flow through the coolant radiator 443, the power electronics 442, the first passage 444*a* of the battery chiller 444, the battery pack 441, and the coolant passage 26*a* of the heater core 26. Accordingly, the coolant may be cooled by the coolant radiator 443, the battery chiller 444, and the heater core 26, and the cooled coolant may cool the power electronics 442 and the battery pack 441.

When the first three-way valve 448 is switched to allow the second port 448*b* to fluidically communicate with the third port 448c, and the second three-way valve 449 is switched to allow the first port 449a to fluidically communicate with the third port 449c, a circulation path of the coolant for cooling the battery pack 441 may be fluidly separated from a flow path of the coolant for cooling the power electronics 442. As the first circulating pump 446 operates, a portion of the coolant may circulate between the first passage 444a of the battery chiller 444, the battery pack 441, and the coolant passage 26a of the heater core 26 through the third bypass conduit 453 so that it may be cooled by the battery chiller 444 and the heater core 26, and the cooled coolant may cool the battery pack 441. As the second circulating pump 447 operates, a remaining portion of the coolant may circulate between the coolant radiator 443 and the power electronics 442 through the second bypass conduit 452 so that it may be cooled by the coolant radiator 443, and the cooled coolant may cool the power electronics 442.

When the first three-way valve 448 is switched to allow the first port 448a to fluidically communicate with the third port 448c, and the second three-way valve 449 is switched to allow the first port 449a to fluidically communicate with the third port 449c, a circulation path of the coolant for cooling the battery pack 441 may be fluidly separated from a flow path of the coolant for cooling the power electronics 442, and the coolant may be allowed to bypass the heater core 26. As the first circulating pump 446 operates, a portion of the coolant may circulate between the first passage 444a of the battery chiller 444 and the battery pack 441 through the first bypass conduit 451 and the third bypass conduit 453 so that it may only be cooled by the battery chiller 444, and the cooled coolant may cool the battery pack 441. As the second circulating pump 447 operates, a remaining portion of the coolant may circulate between the coolant radiator 443 and the power electronics 442 through the second bypass conduit 452 so that it may be cooled by the coolant radiator 443, and the cooled coolant may cool the power electronics 442.

In the battery-power electronics cooling system 412 illustrated in FIG. 7, the coolant may selectively flow through the coolant passage 26a of the heater core 26 by the switching operation of the first three-way valve 448, and the air cooled by the evaporator 25 may cool the coolant flowing through the coolant passage 26a of the heater core 26 so that the coolant may be supplementarily or additionally cooled. Thus, the performance of the battery-power electronics cooling system 412 for cooling the battery pack 441 and the power electronics 442 may be improved.

When it is necessary to increase the temperature of the battery pack 441 in winter or in a cold start condition of the vehicle, the coolant may flow through the coolant passage 26a of the heater core 26 by the switching operation of the first three-way valve 448, and the PTC heater 27 may be operated, and accordingly the coolant may be heated by the PTC heater 27. The heated coolant may increase the temperatures of the battery pack 441 and the power electronics 442.

Furthermore, when the heating of the passenger compartment is required in winter, the first three-way valve 448 may be switched to allow the second port 448b to fluidically communicate with the third port 448c, and the second three-way valve 449 may be switched to allow the second port 449b to fluidically communicate with the third port 449c so that the coolant may circulate through a single integrated circulation path. As the first circulating pump 446 and/or the second circulating pump 447 operates, the coolant may sequentially flow through the coolant radiator 443, the power electronics 442, the first passage 444a of the battery chiller 444, the battery pack 441, and the coolant passage 26a of the heater core 26. Accordingly, waste heat of the power electronics 442 and waste heat of the battery pack 441 may be transferred to the air passing through the HVAC casing 30 through the heater core 26, improving interior heating efficiency. Here, as the active air flap 73 closes the front grille 72 of the vehicle, and the cooling fan 23a is stopped, the power electronics radiator 342 may minimize heat exchange with the ambient air so that the waste heat of the battery pack 441 and the waste heat of the power electronics 442 may be efficiently transferred to the heater core 26 without heat leakage. When the heating of the passenger compartment is performed by the waste heat of the battery pack 441 and the waste heat of the power electronics 442, the operation of the PTC heater 27 may be stopped or minimized, and thus power consumption may be significantly reduced.

Figure 8:
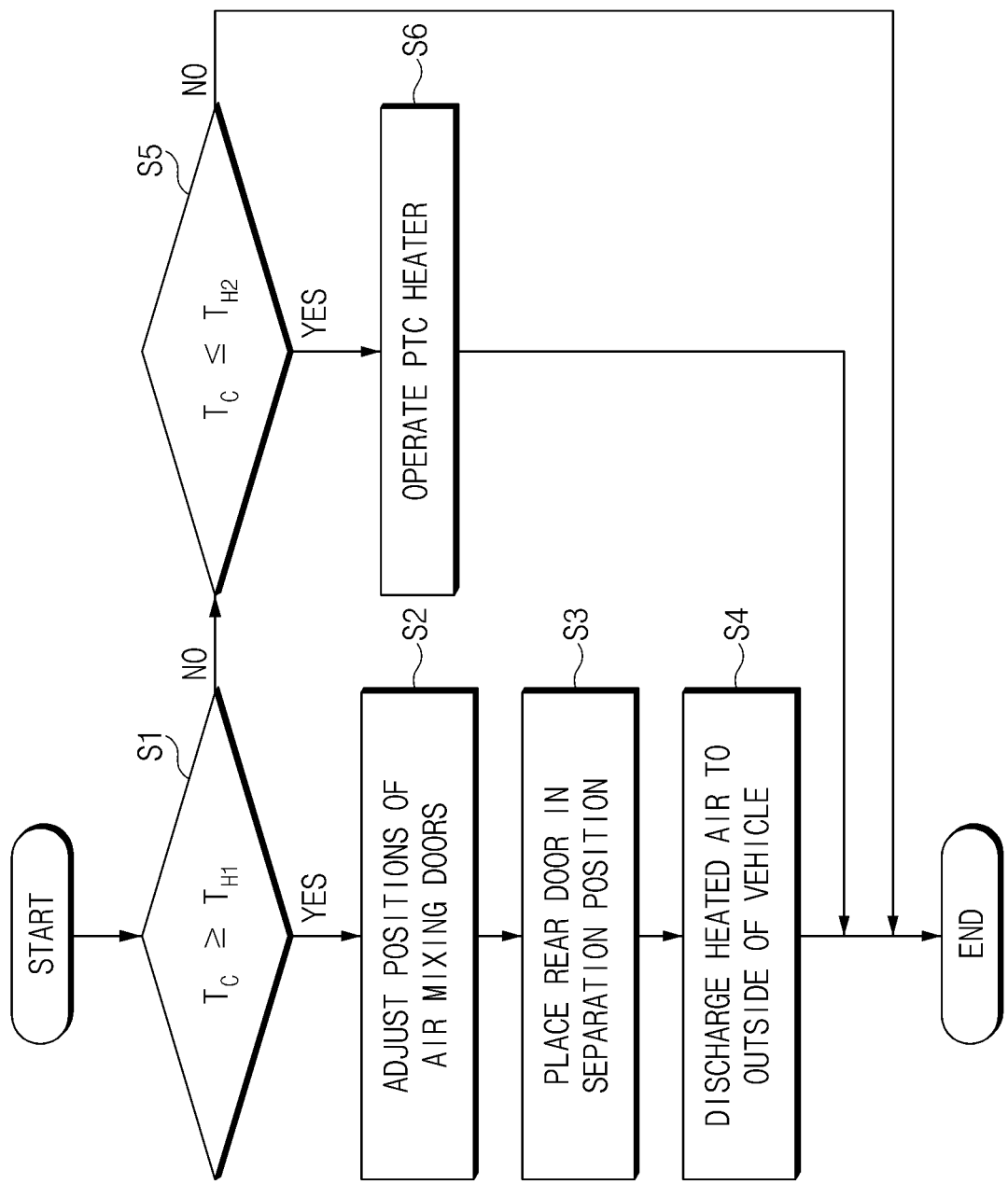
FIG. 8 illustrates a flowchart of a method for controlling a vehicle thermal management system according to an exemplary embodiment of the present disclosure.

FIG. 8 illustrates a flowchart of a method for controlling a vehicle thermal management system according to an exemplary embodiment of the present disclosure.

Referring to FIG. 8, the controller 100 may determine whether a temperature $T_C$ of a coolant circulating through the coolant loop 40, 140, 240, 340, 450 of the cooling subsystem 12, 112, 212, 312, 412 is higher than or equal to a first threshold $T_{H1}$ (S1). The temperature $T_C$ of the coolant may be measured by a temperature detector mounted on the coolant loop 40, 140, 240, 340, 450 of the cooling subsystem 12, 112, 212, 312, 412, and the first threshold $T_{H1}$ may be a reference temperature of the coolant for determining whether the cooling performance or cooling capacity of the cooling subsystem meets a cooling load for various vehicle components. When the temperature $T_C$ of the coolant is higher than or equal to the first threshold $T_{H1}$, the controller 100 may determine that the cooling capacity of the cooling subsystem does not meet the cooling load for various vehicle components, and when the temperature $T_C$ of the coolant is lower than the first threshold $T_{H1}$, the controller 100 may determine that the cooling capacity of the cooling subsystem meets the cooling load for various vehicle components.

When it is determined in S1 that the temperature $T_C$ of the coolant is higher than or equal to the first threshold $T_{H1}$, the controller 100 may control the first actuator 14a and the second actuator 15a to appropriately adjust the position of the upper air mixing door 34 and the position of the lower air mixing door 35 so that at least a portion of the air cooled by the evaporator 25 may pass across the heater core 26 (S2).

The controller 100 may control the second actuator 15a to cause the lower air mixing door 35 to completely close (cover) the lower bypass passage 38b so that at least a portion of the air cooled by the evaporator 25 may pass across the lower portion of the heater core 26. The portion of the air cooled by the evaporator 25 may pass through the lower space 13b by the partition 36, and the air having passed through the lower space 13b may pass across the lower portion of the heater core 26, and may not pass through the lower bypass passage 38b. Accordingly, the portion of the air cooled by the evaporator 25 may transfer or carry heat to the coolant flowing through the coolant passage 26a of the heater core 26, and thus the coolant circulating through the coolant loop of the cooling subsystem may be supplementarily or additionally cooled. The controller 100 may control the first actuator 14a to adjust the position of the upper air mixing door 34 to respond to a required cooling temperature set by the occupant. A remaining portion of the air cooled by the evaporator 25 may pass through the upper space 13a by the partition 36, and the air having passed through the upper space 13a may pass through the upper bypass passage 38a and/or the upper portion of the heater core 26. Accordingly, the remaining portion of the air cooled by the evaporator 25 may selectively pass through the upper bypass passage 38a and/or the upper portion of the heater core 26, and thus the temperature of the air may be appropriately adjusted.

The controller 100 may control the actuator 37a of the rear door 37 to place the rear door 37 in the separation position (S3). As the rear door 37 is in the separation position, the air mixing chamber 39 defined behind the heater core 26 may be divided into the upper air mixing chamber 39a and the lower air mixing chamber 39b. Accordingly, the air having passed through the upper bypass passage 38a and/or the upper portion of the heater core 26 may be mixed in the upper air mixing chamber 39a, and the air having passed through the lower portion of the heater core 26 may be collected in the lower air mixing chamber 39b.

The air heated by the heater core 26 may be collected in the lower air mixing chamber 39b by the rear door 37. The controller 100 may control the actuator 18a of the flap 18 to place the flap 18 in the open position, discharging the heated air to the outside of the vehicle through the discharge pipe 16 (S4).

When it is determined in S1 that the temperature $T_C$ of the coolant is lower than the first threshold $T_{H1}$, the controller 100 may determine whether the temperature $T_C$ of the coolant is equal to or less than a second threshold $T_{H2}$ (S5).

The second threshold $T_{H2}$ may be a reference temperature for determining whether it is necessary to increase (warm-up) the temperatures of various vehicle components to be cooled by the cooling subsystem. For example, the vehicle components need to be heated to an appropriate temperature in winter or in a cold start condition of the vehicle.

When the temperature $T_C$ of the coolant is equal to or less than the second threshold $T_{H2}$, the controller 100 may determine that it is necessary to increase the temperatures of the vehicle components, and when the temperature $T_C$ of the coolant is higher than the second threshold $T_{H2}$, the controller 100 may determine that it is not necessary to increase the temperatures of the vehicle components. According to an exemplary embodiment of the present disclosure, the second threshold $T_{H2}$ may be higher than the first threshold $T_{H1}$.

When it is determined in S5 that the temperature $T_C$ of the coolant is equal to or less than the second threshold $T_{H2}$, the controller 100 may operate the PTC heater 27 (S6), and accordingly the coolant flowing through the coolant passage 26a of the heater core 26 may be heated to an appropriate temperature and the vehicle components may also be heated.

During the cooling operation of the HVAC subsystem 11 (that is, the HVAC subsystem 11 operates in the cooling mode), when the cooling performance or cooling capacity of the cooling subsystem does not meet the cooling load for various vehicle components, it may be necessary to relatively lower the cooling load for the vehicle components by relatively reducing the cooling performance of the HVAC subsystem or stopping the HVAC subsystem. However, as the cooling performance of the HVAC subsystem is reduced or the HVAC subsystem is stopped, the temperature of the passenger compartment may be relatively increased, and thus the internal comfort of the vehicle may deteriorate. To deal with this, when the air mixing doors 34 and 35 are controlled to allow at least a portion of the air cooled by the evaporator to pass across the external surface of the heater core, the temperature of the coolant flowing through the coolant passage of the heater core may be lowered by the cooled air, but the air heated by the heater core may flow into the passenger compartment. Thus, the temperature of the passenger compartment may still be increased, and thus the internal comfort of the vehicle may deteriorate.

According to exemplary embodiments of the present disclosure, when the HVAC subsystem 11 operates in the cooling mode, the HVAC subsystem 11 and the cooling subsystem may be controlled to appropriately cool the coolant circulating through the cooling subsystem by the heater core 26 and to discharge the air heated by the heater core 26 to the outside of the vehicle, and thus the cooling performance of the HVAC subsystem 11 may be kept constant, and the cooling performance of the cooling subsystem may be improved.

As set forth above, according to exemplary embodiments of the present disclosure, the coolant may be selectively cooled by the heater core or selectively heated by the PTC heater so that heat exchange efficiency between the HVAC subsystem and the cooling subsystem may be improved, and thus the performance of the HVAC subsystem and the performance of the cooling subsystem may also be improved.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle thermal management system, comprising:
a heating, ventilation, and air conditioning (HVAC) subsystem including an HVAC casing in which a heater core and an evaporator are received; and
a cooling subsystem including a coolant loop through which a coolant circulates,
wherein the heater core is located on a downstream side of the evaporator in an air flow direction,
wherein the coolant loop is thermally connected to the heater core, and
wherein the HVAC subsystem includes:
an air mixing chamber located on a downstream side of the heater core within the HVAC casing;
a discharge pipe fluidically communicating with the air mixing chamber, and being opened to an outside of a passenger compartment; and
a flap configured for selectively opening and closing the discharge pipe,
wherein the HVAC casing includes a rear seat outlet configured to direct an air toward a rear seat of the vehicle,
wherein the rear seat outlet is adjacent to a floor of the vehicle,
wherein the discharge pipe is connected to the rear seat outlet,
wherein the discharge pipe is opened toward a bottom portion of the floor of the vehicle, and
wherein the flap is rotatable between the discharge pipe and the rear seat outlet.

2. The vehicle thermal management system of claim 1, wherein the HVAC casing includes:
an upper bypass passage defined between a top end portion of the heater core and a top wall of the HVAC casing;
a lower bypass passage defined between a bottom end portion of the heater core and a bottom wall of the HVAC casing;
an upper air mixing door movable to adjust an opening amount of the upper bypass passage; and
a lower air mixing door movable to adjust an opening amount of the lower bypass passage.

3. The vehicle thermal management system of claim 2, wherein the HVAC subsystem further includes a partition by which a space of the HVAC casing defined between the evaporator and the heater core is divided into an upper space and a lower space,
wherein the upper air mixing door is movable in the upper space, and
wherein the lower air mixing door is movable in the lower space.

4. The vehicle thermal management system of claim 1, wherein the HVAC subsystem further includes a rear door which is rotatable in the air mixing chamber, and
wherein the rear door is configured to move between a separation position in which the rear door separates the air mixing chamber into an upper air mixing chamber and a lower air mixing chamber and a communication position in which the rear door allows the upper air mixing chamber and the lower air mixing chamber to fluidically communicate with each other.

5. The vehicle thermal management system of claim 3, wherein the HVAC subsystem further includes a positive temperature coefficient (PTC) heater which is disposed on an upstream side of the heater core.

6. The vehicle thermal management system of claim 5, wherein the HVAC casing includes an upper support supporting a top end portion of the PTC heater and the top end portion of the heater core, and a lower support supporting a bottom end portion of the PTC heater and the bottom end portion of the heater core.

7. The vehicle thermal management system of claim 1, wherein the HVAC casing includes:
an inlet through which the air is allowed to draw in the HVAC casing;
a defrost outlet configured to direct the air toward a front windshield of the vehicle;
a vent outlet configured to direct the air toward an occupant; and
a floor outlet configured to direct the air toward the floor of the vehicle.

8. The vehicle thermal management system of claim 1, wherein the cooling subsystem is an internal combustion engine cooling system including a coolant loop configured to cool an internal combustion engine, and
wherein the coolant loop is fluidly connected to the heater core, a water jacket of the internal combustion engine, an internal combustion radiator, a coolant control valve, and a coolant pump.

9. The vehicle thermal management system of claim 1, wherein the cooling subsystem is a battery cooling system including a coolant loop configured to cool a battery pack of an electric vehicle,
wherein the coolant loop is fluidly connected to the heater core, the battery pack, a battery chiller, and a circulating pump, and
wherein the battery chiller is configured to transfer heat between a refrigerant loop of the HVAC subsystem and the coolant loop.

10. The vehicle thermal management system of claim 1,
wherein the cooling subsystem is a battery cooling system including a coolant loop configured to cool a battery pack of an electric vehicle using a battery radiator,
wherein the coolant loop is fluidly connected to the heater core, the battery pack, the battery radiator, a battery chiller, and a circulating pump, and
wherein the battery chiller is configured to transfer heat between a refrigerant loop of the HVAC subsystem and the coolant loop.

11. The vehicle thermal management system of claim 1,
wherein the cooling subsystem is a power electronics cooling system including a coolant loop configured to cool power electronics of an electric vehicle, and
wherein the coolant loop is fluidly connected to the heater core, the power electronics, a power electronics radiator, and a circulating pump.

12. The vehicle thermal management system of claim 1,
wherein the cooling subsystem is a battery-power electronics cooling system including a coolant loop configured to cool a battery pack and power electronics of an electric vehicle, and
wherein the coolant loop is fluidly connected to the heater core, the power electronics, the battery pack, a coolant radiator, and a circulating pump.

13. A method for controlling a vehicle thermal management system including a heating, ventilation, and air conditioning (HVAC) subsystem including an HVAC casing in which a heater core and an evaporator are received, and a cooling subsystem including a coolant loop which is configured to cool a vehicle component, the method comprising:
determining, by a controller, whether a temperature of a coolant circulating through the coolant loop of the cooling subsystem is higher than or equal to a first threshold;
in response to determining that the temperature of the coolant is higher than or equal to the first threshold, adjusting, by the controller, a position of an air mixing door to allow at least a portion of air cooled by the evaporator to pass across the heater core; and
discharging, by the controller, the air heated by the heater core to an outside of the vehicle through a discharge pipe; and
in response to determining that the temperature of the coolant is lower than the first threshold, determining, by the controller, whether the temperature of the coolant is equal to or less than a second threshold,
wherein the heater core is located on a downstream side of the evaporator in an air flow direction, and
wherein the coolant loop is thermally connected to the heater core.

14. The method of claim 13, wherein the first threshold is a reference temperature of the coolant for determining whether a cooling capacity of the cooling subsystem meets a cooling load for the vehicle component.

15. The method of claim 13, further including:
separating, by a rear door, an air mixing chamber defined on a downstream side of the heater core into an upper air mixing chamber and a lower air mixing chamber,
wherein the rear door is rotatable in the air mixing chamber, and
wherein the rear door is configured to move between a separation position in which the rear door separates the air mixing chamber into the upper air mixing chamber and the lower air mixing chamber and a communication position in which the rear door allows the upper air mixing chamber and the lower air mixing chamber to fluidically communicate with each other.

16. The method of claim 13, wherein the second threshold is a reference temperature for determining whether it is necessary to increase a temperature of the vehicle component to be cooled by the cooling subsystem.

17. The method of claim 13, further including:
in response to determining that the temperature of the coolant is equal to or less than the second threshold, operating, by the controller, a positive temperature coefficient (PTC) heater to heat the coolant flowing through a coolant passage of the heater core,
wherein the PTC heater is located on an upstream side of the heater core.

18. The method of claim 13, wherein the second threshold is higher than the first threshold.

* * * * *